United States Patent
Weeks

(10) Patent No.: US 6,334,132 B1
(45) Date of Patent: Dec. 25, 2001

(54) METHOD AND APPARATUS FOR CREATING A CUSTOMIZED SUMMARY OF TEXT BY SELECTION OF SUB-SECTIONS THEREOF RANKED BY COMPARISON TO TARGET DATA ITEMS

(75) Inventor: Richard Weeks, Felixstowe (GB)

(73) Assignee: British Telecommunications plc, London (GB)

( * ) Notice: Subject to any disclaimer, the term of this patent is extended or adjusted under 35 U.S.C. 154(b) by 0 days.

(21) Appl. No.: 09/077,603

(22) PCT Filed: Apr. 16, 1998

(86) PCT No.: PCT/GB98/01119

§ 371 Date: Jun. 2, 1998

§ 102(e) Date: Jun. 2, 1998

(87) PCT Pub. No.: WO98/47083

PCT Pub. Date: Oct. 22, 1998

(30) Foreign Application Priority Data

Apr. 16, 1997 (EP) .................................................. 97302616

(51) Int. Cl.[7] .................................................. G06F 17/00
(52) U.S. Cl. .......................... 707/101; 707/100; 707/102; 707/2
(58) Field of Search ................................. 707/3, 4, 101, 707/102, 104, 2, 6; 345/327

(56) References Cited

U.S. PATENT DOCUMENTS

| | | | |
|---|---|---|---|
| 5,418,948 | * | 5/1995 | Turtle ........................................ 707/4 |
| 5,787,435 | * | 7/1998 | Burrows ................................. 707/102 |
| 5,835,087 | * | 11/1998 | Herz et al. ............................. 345/327 |
| 5,848,409 | * | 12/1998 | Ahn ........................................... 707/3 |
| 5,867,164 | * | 2/1999 | Bornstein et al. .................... 345/357 |
| 5,897,637 | * | 4/1999 | Guha .................................... 707/101 |
| 5,907,841 | * | 5/1999 | Sumita et al. ........................... 707/6 |

OTHER PUBLICATIONS

Kupiec et al, "A Trainable Document Summarizer" SIGIR FORUM, Jul. 9, 1995, pp. 68–73, XP000602689.

"Method for Automatic Extraction of Relevant Sentences From Texts", IBM Technical Disclosure Bulletin, vol. 33, No. 6A, Nov. 1990, pp. 338/339, XP002015802.

Patent Abstracts of Japan, vol. 016, No. 102 (P–1324), Mar. 12, 1992, & JP 03 278270 A (Ricoh Co Ltd), Dec. 9, 1991.

Patent Abstracts Of Japan, vol. 018, No. 659 (P–1843), Dec. 13, 1994 & JP 06 259423 A (N T T Data Tsushin KK), Sep. 16, 1994.

Paice, "Constructing Literature Abstracts by Computer: Techniques and Prospects", Information Processing & Management (Incorporating Information Technology), vol. 26, No. 1, 1990,k pp. 171–186, XP000605124.

Patent Abstracts of Japan, vol. 015, No. 015 (P–1151) Jan. 11, 1991 & JP 02 257266 A (Teremateiiku Kokusai Kenkyusho:KK), Oct. 18, 1990.

* cited by examiner

Primary Examiner—Wayne Amsbury
Assistant Examiner—Thuy Pardo
(74) Attorney, Agent, or Firm—Nixon & Vanderhye, P.C.

(57) ABSTRACT

A system for summarizing data sets stores target data items and divides the data set into sections. Each section is compared against the target data items and a ranking value is calculated for each section dependent on the outcome of the comparisons. A summary of the data set is then compiled from sections having a ranking value past a pre-determined threshold value.

13 Claims, 15 Drawing Sheets

Compare against target data items and assign ranking value

Generate summary

Modify summary using distribution value

Generate key data item set

*Calculate distribution value*

*Calculate second score*

Score skewing

*Summary rules*

METHOD AND APPARATUS FOR CREATING A CUSTOMIZED SUMMARY OF TEXT BY SELECTION OF SUB-SECTIONS THEREOF RANKED BY COMPARISON TO TARGET DATA ITEMS

RELATED APPLICATIONS

The application is related to EP97302616.4 filed on Apr. 16, 1997; and PCT/GB98/01119 filed on Apr. 16, 1998.

BACKGROUND OF THE INVENTION

1. Field of the Invention

This invention lies in the field of methods and apparatus for analysing data and finds particular application in summarising data.

2. Related Art

Recent advances in technology, such as CD-ROMs, Intranets and the World Wide Web have provided a vast increase in the volume of information resources that are available in electronic format.

A problem associated with this increase in resources is that of locating and identifying sets of data (i.e. data sets, examples of which include magazine articles, news articles, technical disclosures and other information) of interest to individual user of these systems.

Information retrieval tools such as Search engines and Web guides are one means for assisting users to locate data sets of interest. Proactive tools and services (e.g. News groups, broadcast services such as the POINTCAST™ system available at www.pointcast.com or tools like the JASPER agent detailed in the applicants co-pending, published international patent application PCT GB96/00132,) may also be used to identify information that may be of interest to individual users.

Once data sets of interest have been located by the information retrieval tool, the user is commonly provided with a summary of the data set. "Patterns of Lexis in Text (Describing English Language Series)" Michael Hoey, Oxford University Press, 1991 ISBN 0194371425 details one approach to summarising data sets.

A typical summary produced by a prior-art method will detail the primary subject matter (i.e. the main topic) of the data set. However, target data items, which the user is actually interested in are often not the main topic of the data set located. Under these circumstances, a summary which only gives the main topic will not identify how or why the target data items are relevant to the data set, or the location of these target data items within the data set.

By way of example, the target information may be the birth date of the author "D. H. Lawrence". A search engine may locate this information in an article whose primary subject matter is a critique of his novel "Sons and Lovers". An information retrieval tool, having found the birth date, would select the critique and produce a summary. This summary however will not contain the birth date of D. H. Lawrence as the author's birth date would be of almost no importance to the main topic in a critique of "Sons and Lovers". Nor would the summary identify where in the critique the information about the author's birth date appears.

SUMMARY OF THE INVENTION

According to a first aspect of the present invention there is provided apparatus for summarising data sets, the apparatus having:

an input for receiving a data set to be summarised;

sectioning means for dividing said received data set into one or more sections according to pre-determined criteria;

ranking means operable for each said section to compare data within the said section with one or more target data items and for calculating a ranking value for the said section, said ranking value being dependent on the outcome of said comparisons for the said section; and selecting means for compiling a customised summary of the data set by selecting one or more of said one or more sections according to their respective ranking values.

For instance, sections having a ranking value which is above (or below, depending on the circumstances) a preselected threshold might be selected.

According to a second aspect of the present invention there is provided a method for generating a customised summary of a data set, the method including the steps of:

i) receiving, as input, a data set to be summarised;

ii) dividing said data set into sections according to pre-determined criteria;

iii) comparing data items in each said section against one or more target data items;

iv) calculating a ranking value for each said section in dependence upon the outcome of the respective said comparisons; and v) compiling a customised summary of said data set by selecting one or more of said one or more sections according to their respective ranking values.

Preferably, target data items can be loaded to the target data item store by a user, for instance either directly or via a user profile. An advantage of such embodiments of the invention is that they enable a summarising tool to generate a summary of a data set that includes target data items specified by a user for whom the summary is generated.

There are many additional features which may be provided separately or in combination, by preferred embodiments of the present invention and at least some of these are discussed as follows.

Data sets may be divided into sections according to sentences, paragraphs, and other punctuation. Alternatively, other formats such as pages and chapters and headings may form section boundaries.

Within the context of summarising data sets, a key data item is a data item that forms a substantive component of the information contained within the data set. For example, in a document consisting of written prose, articles and conjunctions (for instance words such as 'it', 'are', 'as', 'the', 'when', 'they', 'by' etc.) are typically not considered to be key data items. This is because they do not identify subject matter contained within the data set.

According to preferred features of the present invention, the apparatus includes:

means for identifying one or more key data items in each said section according to a pre-determined stop list;

calculating means operable for each said section to calculate one or more distribution values, each said distribution value representing a different pre-determined measure of the distribution, in said data set, of key data items identified in the said section; and adjustment means for adjusting said ranking value for each said section according to the respective said one or more distribution values.

Preferably the method includes the steps of:

a) identifying key data items within each said section from step ii) according to a pre-determined stop list;

b) calculating, for each said section, one or more distribution values each representing a pre-determined measure of the distribution of the key data items of the said section in said data set; and c) adjusting said ranking value from step iv) for each said section in dependence upon the respective said one or more distribution values.

Refining ranking values according to the distribution of key data items within the data set allows the summary to detail target data items within the context of the main topic of the data being summarized. This increases the user's ability to determine how relevant a particular data set is for their intended purpose.

Preferably the apparatus and method calculate the distribution value for each section by: determining a first score for each key data item in each section; and for each section, summing said first scores for each key data item, wherein said first score of each key data item is calculated as the number of times the key data item of consideration occurs in the data set less the number of times the key data item of consideration occurs in the section of consideration.

This feature of the invention is a measure of how frequently the key data items of a particular section occur throughout the remainder of the data set being analysed. It is one measure of the distribution of key data items throughout the data set.

Preferably said apparatus and method calculate a second score for each key data item and either calculate or modify said distribution value dependent on said second scores, said second scores being calculated by; assigning a position value to each section of the data set corresponding to the position of the section within the data set; and for each key data item of the data set, performing the calculation of subtracting the position value of the first section in which the key data item of consideration occurs from the position value of the final section in which the key data item of consideration occurs.

The second score operates so as to weight those key data items that are spread widely throughout the data set more heavily than those key data items clustered around one portion of the data set. The assumption behind this feature is that key data items that are widely spread throughout the data set are likely to be of greater importance to the main topic of the data set being summarised than those clustered around one section.

Preferably said apparatus is adapted to order selectively, according to user input, the sections within the summary according to either the position value of the sections in the data set or according to the ranking value of the sections.

Preferably said method further comprises the step of receiving a selection input to select between a summary comprising a plurality of sections ordered according to their position values and a summary comprising a plurality of sections ordered according to their ranking values.

Preferably said apparatus and method: calculate a third score for each key data item by identifying every pair of sections in which the key data item of consideration co-occurs and for each pair of sections subtracting the lower position value for the co-occurring sections of consideration from the higher position value of the co-occurring sections of consideration and dividing the result by the second score of the key data item of consideration; calculate a first adjustment value for each section by summing the third scores calculated for each key data item of each section; and adjust said ranking value for each section dependent on the first adjustment value of each section.

This first adjustment value allows each key data item to contribute to the weighting of each section according to the number of times the key data item occurs in other sections of the data set and according to the separation within the data set of the first and last occurrence of the key data item. Accordingly, key data items that occur frequently will contribute greater amounts to a section's weighting than key data items that are clustered around a small section of the data set.

Preferably, said apparatus and method calculate a second adjustment value for each section by dividing said first adjustment value for each section by the square root of the distribution value of each section.

This calculation normalises the first adjustment value against the length of a section. It has been found that the square root of the distribution value provides better results than dividing by the distribution value alone. This may be because the square root of the second value is a compromise between the proposition that section length has no bearing on the relevance of that section to the main topic of the information in question and the proposition that the length of a section solely determines how relevant that section is to the main topic of the information in question.

Preferably, said apparatus and method modify the ranking value of each section by dividing each ranking value by the position value of the corresponding section.

This modification to the ranking value increases the weighting of those sections occurring earlier in a piece of information over those sections occurring later in the piece of information.

Where different types of data set are summarised, alternative rules relating to the distribution of key data items may apply. For example, in an information table, headings on columns and/or rows are likely to form a basis for an accurate summary of the information contained within the data set.

BRIEF DESCRIPTION OF THE DRAWINGS

An information summariser according to an embodiment of the present invention will now be described, by way of example only, with reference to the accompanying figures, in which.

DESCRIPTION OF THE PREFERRED EMBODIMENTS

Figure 1:
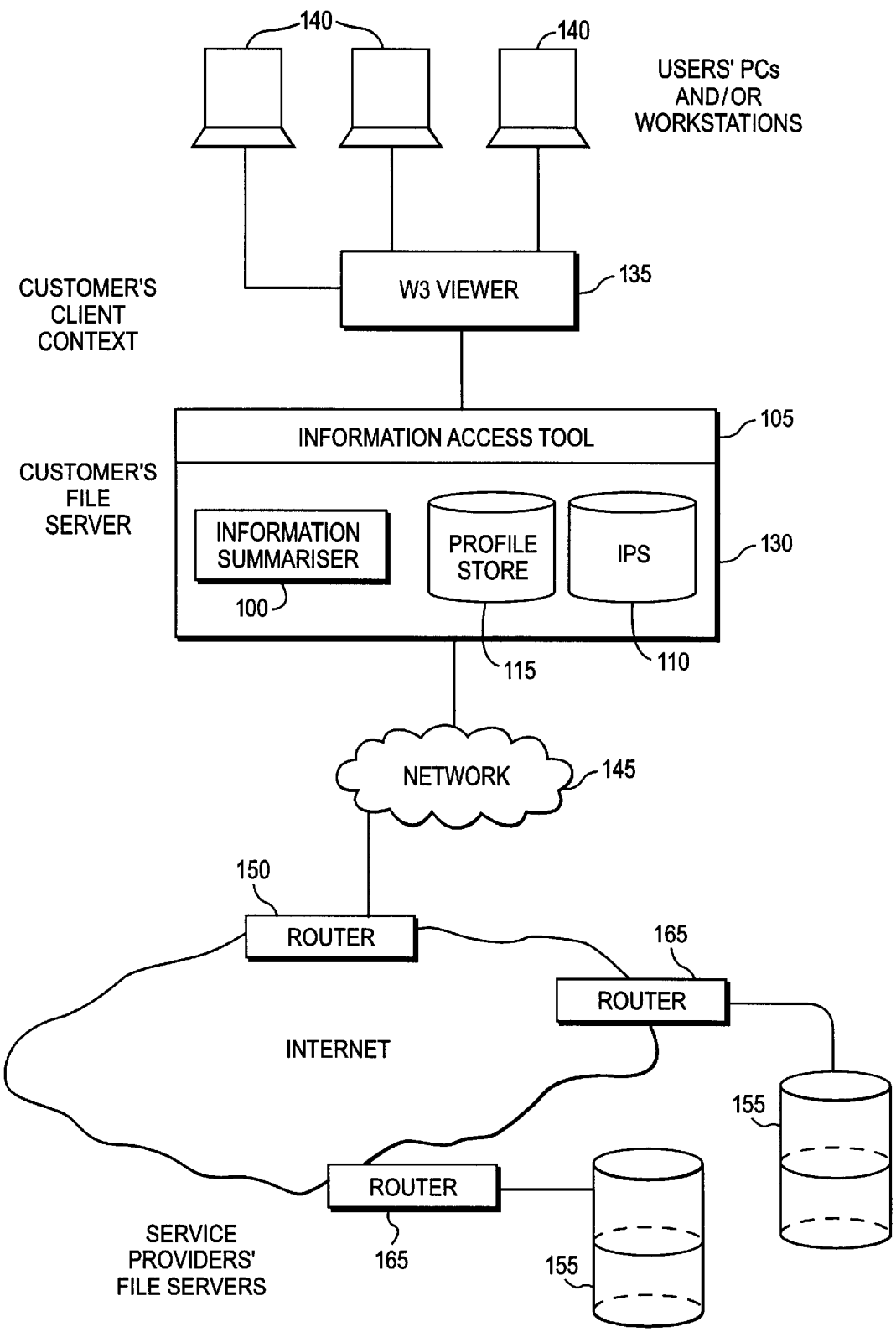
FIG. 1 shows an information retrieval and processing system incorporating the information summariser.

Referring to FIG. 1, the information summariser may be built into a known form of information retrieval architecture, such as a client-server type architecture connected to the Internet.

In more detail, a customer of an Internet service provider, telecommunications carrier or some other form of service provider, such as an international company, may have multiple users equipped with personal computers or workstations 140. These may be connected via a World Wide Web (WWW) viewer 135 in the customer's client context to the customer's WWW file server 130. An information summarising tool 100 may form an extension of the viewer 135, and may actually be resident on the WWW file server 130.

The customer's WWW file server 130 may be connected to the Internet in known manner, for instance via the customer's own network 145 and a router 150. Service providers' file servers 155 can then be accessed via the Internet, again via routers 165.

Also resident on, or accessible by, the customer's file server 130 are an information access tool 105, a profile store 115 for storing user profiles used by the information access tool 105 and an intelligent page store 110 also used by the information access tool 105.

The information access tool 105 may be of a type known as a JASPER agent identified above.

In one embodiment the summarising tool 100 may be built as an extension of a known viewer such as Netscape and operate to summarise WWW pages extracted by viewer 135. However, clearly the summarising tool 100 could be built into other environments or used independently, and can be used to summarise documents and data sets from many different sources or of many different types. They will preferably however be in an electronic format, or convertible to such a format, which the summarising tool 100 is adapted to receive and process. Further, documents and data sets most suitable for processing by the summarising tool 100 will usually be in textual form, for instance a spoken natural language such as English.

Figure 2:
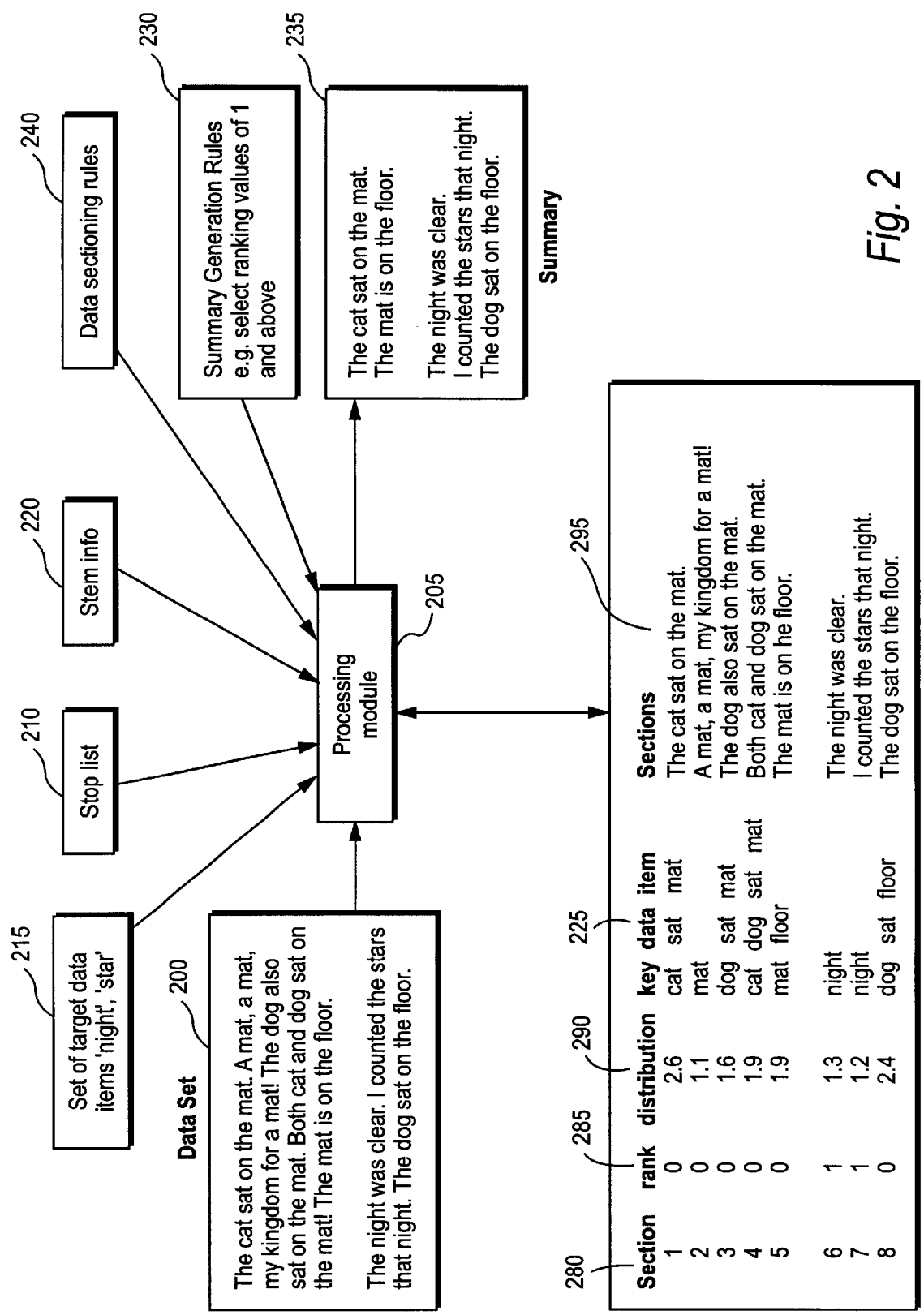
FIG. 2 shows a schematic representation of the information summariser of FIG. 1 in use.

Referring to FIG. 2, in overview, the summariser 100 works by dividing a data set 200 into sections 295, analysing the sections 295 and selecting certain sections to produce a summary 235. Data sectioning rules 240 determine how a data set 200 is divided. The sections 295 are analysed in relation to target data items 215, usually reflecting a user's interests, and in relation to key data items 225 reflecting the subject matter of the data set 200 itself. Then summary generation rules 230 are used to determine how the sections are selected, in the light of the analysis.

The summariser 100 comprises a processing module 205 which is adapted to receive a data set 200 and a set of target data items 215. The module 205 produces key data items from the data set 200 itself and analyses the data set 200 to generate a summary 235 thereof as output.

The set of target data items 215 are indicative of one or more types of information that a user wishes to locate in a data set 200. Such target data items therefore can include keywords, terms, phrases, numbers, dates and/or other information that serve to identify and/or define information of the type that the user wishes to locate.

Similarly, the key data items can comprise keywords, terms, phrases, numbers, dates and/or other information.

The preferred embodiment described has a further two inputs. These are stop list information 210 and stem information 220 which are used in producing the key data items 225 from a data set 200.

The stop list information 210 contains lists of data items, such as commonly used words and definite and indefinite articles, that typically will not serve to identify the subject matter of the data set 200. Such a list may be used to delete superfluous data items from the data set 200. In this way data items more likely to be central to the subject matter of the data set 200 may be identified and formed into a set of key data items 225. The stop list 210 may also contain data items such as common phrases and terms.

The stem information 220 contains a list of pre-fixes and suffixes which are used to reduce data items in the set of key data items 225 to a basic form. For example, assume that the word 'bounce' is a data item in the set of key data items 225. The stem information 220 preferably operates to reduce "bounce" and, for example, any additional occurrences of 'bouncing', 'bounced', 'bounces' etc in the key data item set 225 to the basic form 'bounc'.

Alternatively, Porter's Algorithm may be used to stem the key data items contained in the key data item set 225. Porter's Algorithm is detailed in Porter, M F, 1980: "An Algorithm for Suffix Stripping", published in Program 14(3), pp 130–137.

It should be noted that stop lists and stem information may not be essential to a system for producing a key data item set 225 from a data set 200. In particular, the stemming procedure may not be required if the system instead has access to a full dictionary setting out both parts of speech and word endings. The essence of the stemming operation is just to equate related words and in this respect a thesaurus could also be useful.

Alternative embodiments of the present invention may use a natural language processing algorithm and/or system or some other technique known in the art to identify key data items 225 in a data set 200.

In use of the summariser 100, the sections 295, for a data set 200 that is primarily written in prose, are typically sentences or paragraphs. In the example described below, each of the sections 295 is a sentence of the data set 200.

As a first step in selecting sections to make up a summary, the sections 295 are compared with a set of target data items 215. This set of target data items 215 may be for instance a set of keywords from a user profile which is re-used in other processes. Indeed, in the embodiment of FIG. 1, user profile information accessible to the summariser 100, and containing target data items for respective users, is actually that stored in the profile store 115 for use by the information access tool 105. Each user profile in the profile store 115 comprises, at least in part, a set of target data items 215 for the relevant user that may also be input to the processing module 205 of the summariser 100.

On the basis of the comparison between the sections 295 of the data set 200 and a selected set of target data items 215, each section 295 is assigned a ranking value 285 which is a measure of the extent to which it contains the set of target data items 215.

A distribution value 290 is then also calculated for each section 295. The distribution value 290 operates as a measure of the relevance for each section 295 to the subject matter of the data set 200 as a whole. More detail on ways of calculating the ranking values 285 and the distribution values 290 is provided below. In the present embodiment, a comparatively high distribution value 290 indicates that a section 295 contains more detail on the subject matter of a data set 200 than does a section 295 with a comparatively low distribution value 290.

A summary 235 of the data set 200 is then generated, based on the ranking values 285 and the distribution values 290 that are calculated for the sections 295, using the summary generation rules 230. For instance, a summary 235 of the data set 200 may be generated by ordering the sections 295 according to their ranking values 285 and then modifying the ranking values 285 according to the distribution values 290. A predetermined number of sections 295 are then consecutively selected in turn, from the highest ranked downwards, and output as the summary 235.

The summary 235 may be created by reproducing the selected sections in different orders. For instance, the selected sections may be reproduced either in the order in which they appeared in the data set 200 or in the order of their ranking value 285 as modified by the distribution value 290. The manner in which the summary 235 is created is preferably selectable by a user.

The information summariser 100 and its operation are now described in more detail.

Figure 3:
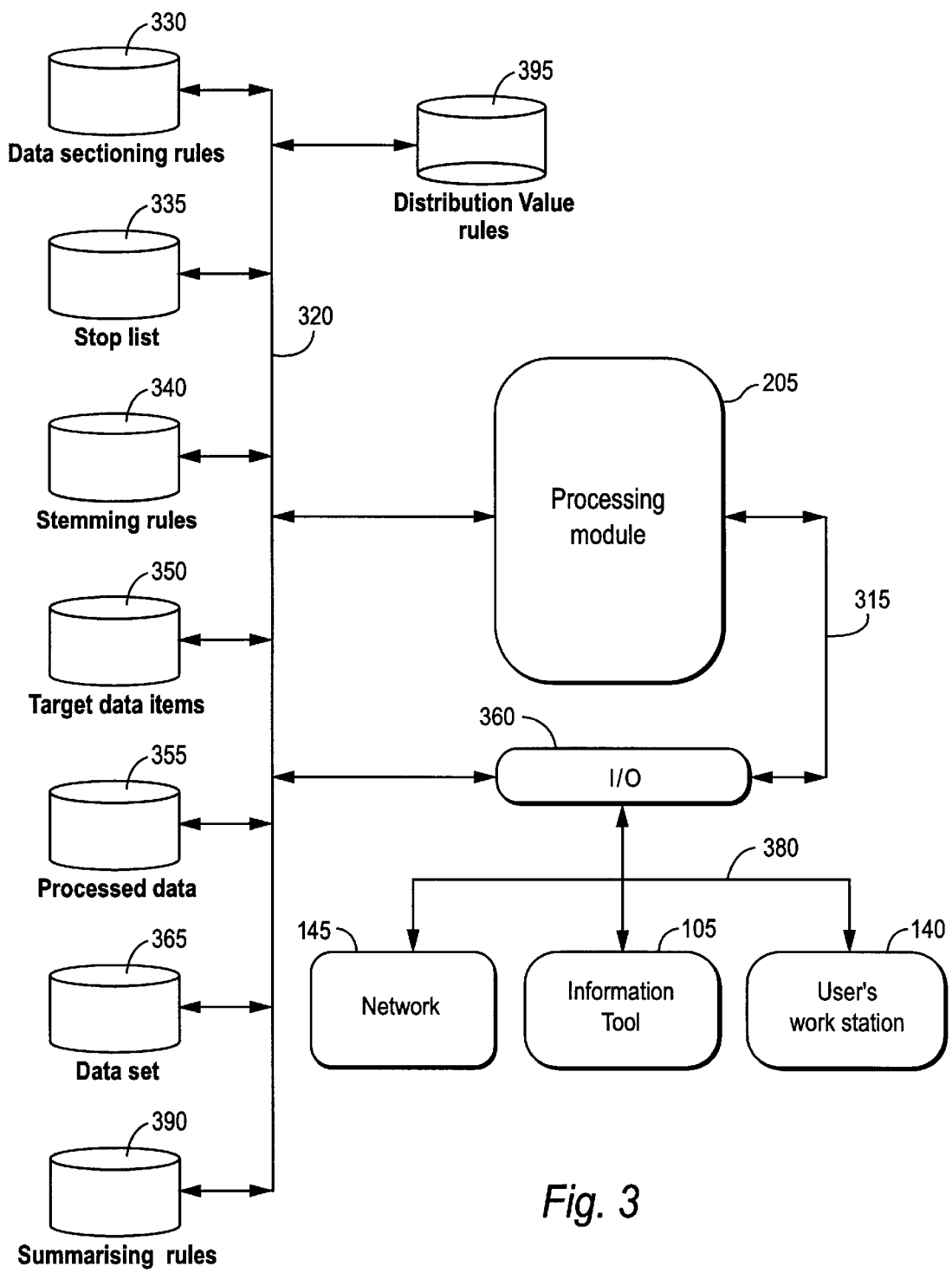
FIG. 3 is a schematic representation of components of the information summariser.

Referring to FIG. 3, principal components of the information summariser 100 comprise the processing module 205, a set of data stores and an input/output (I/O) capability 360. The information summariser 100 comprises software and data stores which can be loaded and run on known types of platform, such as a customer's file server 130. Hardware to support the summariser 100 can therefore be of known type and will generally have an operating system, data storage and processing capacity and be able to support data flows 320 between the various components, and control communications 315 where needed, for instance between the processing module 205 and the I/O capability 360. (Although shown separated in FIG. 3, the processing module 205 and the I/O capability 360 may in practice be designed as different parts of the same software module.)

The processing module 205 comprises the software process, installed on processing capacity such as microprocessors of the file server 130, which instigates and controls the summarisation of a data set 200 in response to inputs via the I/O capability 360.

The data stores comprise:
- a data sectioning rules store 330 that stores the data sectioning rules 240;
- a stop list store 335 that stores the stop list 210;
- a stemming rules store 340 that stores the stemming information 220;
- a target data items store 350 for storing the set of target data items 215;
- a processed data store 355 for storing data processed by the processing module 205;
- a data set store 365 for storing data sets 200;
- a distribution value rule store 395 for storing distribution value rules; and
- a summary generation rules store 390 for storing the summary generation rules 230.

Although shown separately in FIG. 3 for clarity, one or more of the data stores may not be separate from the processing module 205 but the contents simply embedded in the logic of the processing module 205. Further, the data stores need not necessarily offer persistent storage. For instance, the target data items store 350 may simply store target data items input by a user, or from another process, for the duration of a summarisation exercise on a single data set.

The functionality of the I/O capability 360 is generally of known type and is not therefore discussed in great detail herein. However, the sort of functionality it provides is as follows.

The I/O capability 360 communicates with systems and components external to the summariser 100 such as a user's personal computer or workstation 140 or an information tool 105. It may further be connected to a corporate communications network 145 and/or the Internet so that remote users, systems and components can access and run the summariser 100. The I/O capability 360 will generally provide interfaces for receipt of data sets 200 for processing and for output of summaries 235. These interfaces may therefore be designed to accept and output text, Word and HTML (HyperText Markup Language) formats, for example, for transfer by commonly used protocols such as Simple Message Transfer (SMTP), HyperText Transfer (HTTP) and File Transfer (FTP). The I/O capability 360 will also provide the user interface to the summariser 100 and therefore will generally have for instance a forms capability for capturing user requests and information, possibly together with a registration and authentication process so that only registered users can run the summariser.

If the processing module 205 is adapted to deal with data sets 200 in various formats such as plain text, Word and HTML, the I/O capability 360 can operate to present data sets 200 to the module 205 so far as they arrive or are stored in compatible formats. However, if the module is only adapted to operate on data sets 200 of one or two formats, say plain text only, then the I/O capability 360 may preferably also provide a filter or conversion process so that data sets 200 having other formats can be converted to the acceptable format. Commercial software is available for that purpose and further detail is not therefore given herein.

It might be noted though that known filters of this type usually operate by stripping formatting characters from a file, such as those for bold type and different fonts. This can mean that information normally present in a file, which would have been useful to some forms of the summariser of the present invention, is lost. For instance, heading formatting characters stripped out by such a filter might otherwise be used to raise ranking values given to sections of a data set 200 which are headings.

The I/O capability 360 may also provide an interface which can be called up by other processes so that summarisation can be performed within another exercise. An example of that might be for instance a reporting tool in a management system which has a requirement to offer summaries to high level users. Such a reporting tool may need to run the summariser 100 on documents it needs to load to its system, using target data items it already stores in relation to the high level users. Such a reporting tool could require to load both data sets 200 and target data items 215 directly to the summariser 100, via the I/O capability 360.

In operation, data sets 200 to be summarised can be loaded to the data set store 365. This might be done on a "one-off" basis, for instance from the corporate network 145, or as a batch or repeated process, for instance via the information tool 105 as a step in a regular operation otherwise carried out by the information tool 105. Receipt and loading can also be dealt with by the I/O capability 360, for instance in response to direct inputs by a remote user or in response to user inputs via the information tool 105.

Sets of target data items 215 can also be loaded, this time to the target data items store 350, on a "one-off" basis or as part of a batch or repeated process. For instance, a user may enter a set of target data items 215 for use in a specific summarisation exercise, or sets of target data items 215 may be loaded as the output of a user registration exercise for a summarisation service. Again, receipt and loading can be dealt with by the I/O capability 360.

Alternatively, in the embodiment of FIG. 1, a set of target data items 215 may be passed to the target data items store 350 from the information tool 105. Here, the set of target data items 215 passed to the target data item store 345 may be a user profile stored in the profile store 115.

A set of target data items 215 received from a user or other input to the summariser 100 may in practice be modified by the processing module 205, for instance to extend it to include synonyms and other related words. This could be done using a thesaurus or by using an information clustering technique, for instance such as that described as using a similarity matrix in the applicant's co-pending international application PCT GB96/00132 referred to above.

Each of the data stores detailed above in relation to FIG. 3 may be part of a random access memory, a hard drive, a combination of these or other such memory devices well known in the art.

Process Overview

Figure 4:
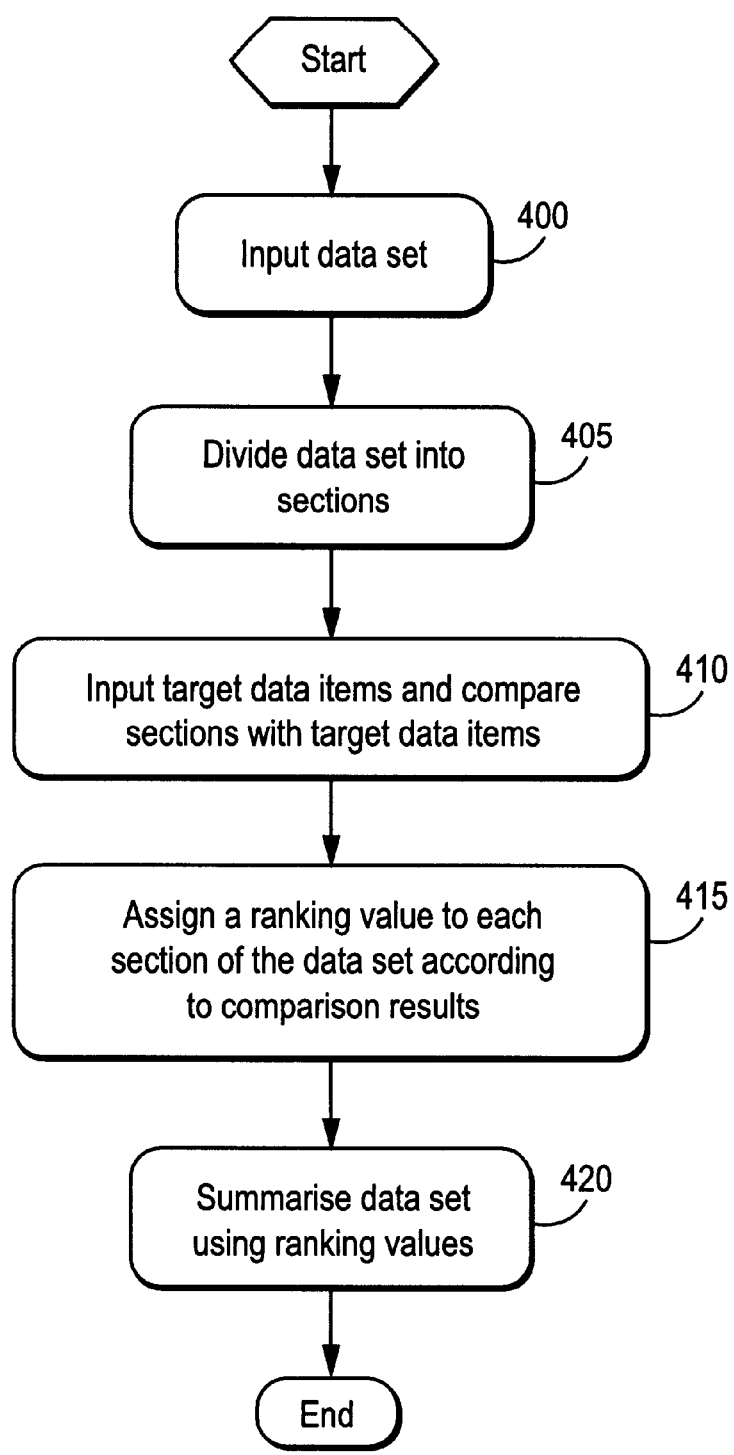
FIG. 4 is a flow chart of the operation of the information summariser of FIG. 1.

FIG. 4 details the steps of one embodiment of the present invention. In particular, it shows the steps involved in processing a data set 200 by dividing it into sections and ranking the sections in accordance with the presence in the sections of target data items.

This process, run by the processing module 205, will be launched in known manner from the I/O capability 360 for instance in response to an incoming request from a user workstation 140. The incoming request may contain a URL (Universal Resource Locator) for a file (data set 200) accessible via the Internet, an indication that summarisation is required, and also, usually, user identification. Alternatively, of course, the user input may include the data set 200 or may include a means for the processing module 205 to locate a selected data set already stored in the data set store 365. The user input may also contain a set of target data items 215, or the user identification may be sufficient for the processing module 205 to locate a set of target data items 215 in the target data item store 350.

At step 400 the processing module 205 downloads the data set 200 from the given URL via the Internet, or from the data store 365, and selects a set of data sectioning rules 240 from the data sectioning rules store 330. At step 405 the data set 200 is divided into sections 295 according to the data sectioning rules 240. Each section is then preferably stored in the processed data store 355. Further detail on the structure of the processed data store 355 is provided below in relation to FIG. 5.

At step 410, if the user input didn't include a set of target data items 215, the processing module 205 retrieves a set from the target data items store 350, for instance selected according to the relevant user identifier. The processing module 205 then compares each section 295 against the set of target data items 215.

The purpose of this comparison is to identify the number of times that data items in the set of target data items 215 occur in each selected section 295.

At step 415, a ranking value 285 is assigned to each section 295 corresponding to the number of instances of target data items occurring in the selected section 295. This ranking value 285 is used to identify those sections 295 in the data set 200 that match closely with the set of target data items 215. Alternatively, the ranking value 285 may be modified so as to account only once for key data items that are repeated in a section 295.

At step 420, the ranking values 285 of the sections 295 are assessed and a summary generated. In one embodiment, the summary is generated from the ranking values 285 alone, with a pre-determined number of sections 295 selected from those sections 295 having the highest ranking values 285.

In other embodiments, discussed in greater detail below, various other rules are applied to the data set 200. These rules adjust the ranking values 285 of the sections 295. They aim to produce a summary that contains contextual information about the data set 200, so that the sections 295 forming the summary may be understood within the context of the data set 200 as a whole.

All the rules for generating and modifying ranking values 285 can be stored in the summarising rules store 390 or one or more may be built into the processing module 205.

Sectioning

Figure 5:
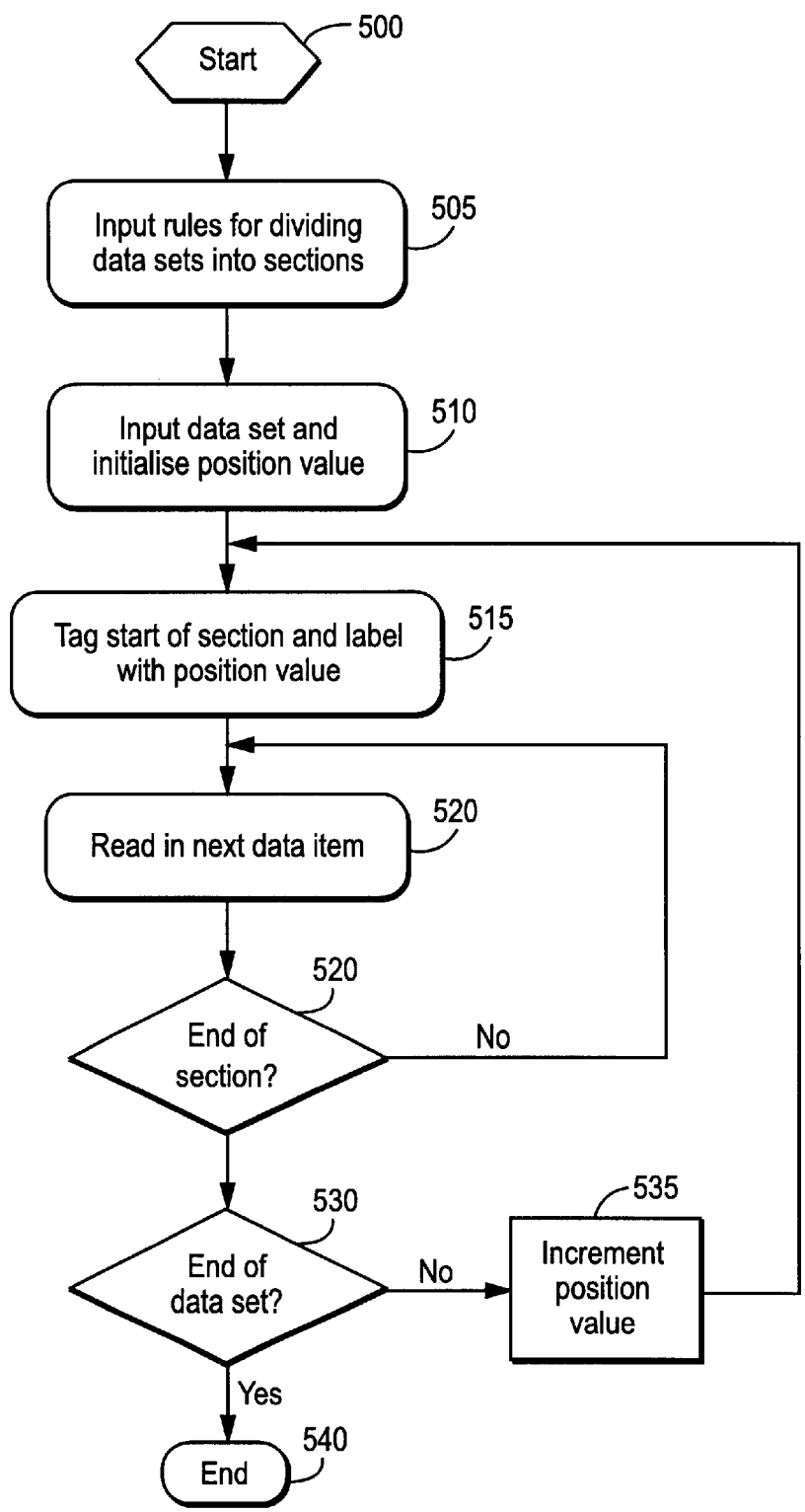
FIG. 5 is a flow chart of step 405 in FIG. 4.

FIG. 5 is a flow chart of step 405 in FIG. 4 in greater detail.

At step 505, the rules for dividing a data set 200 into sections 295 are retrieved from the data sectioning rules store 330. These rules will affect the way in which a summary is put together for the end user. If a data set 200 is sectioned by sentence, it will result in a different summary from a data set 200 which has been sectioned by paragraph. Similarly, a table might be sectioned by cell, row or column. Hence it may be preferable that a user can select the particular data sectioning rules to be applied. This selection can be handled by interaction between the user and the I/O capability 360 and passed to the processing module 205.

At step 510, the selected data set 200 is retrieved from the data set store 355 and a position value 280 is initialised, preferably so that the identified sections 295 in the selected data set 200 can be labelled in a numerically ascending order.

At step 515, the start of the data set 200 is tagged as the beginning of a section 295 and labelled with the current position value 280 which is "1" in this case.

At step 520, the first data item of the data set 200 is read and at step 525 it is tested for whether it meets any of the rules specified by the sectioning criteria, eg if the data item is a period marker signalling "end of sentence", then under one rule set the end of a section 295 is identified.

If the end of section 295 criteria specified by the sectioning rules is not met, then the step 520 of reading the next data item and the step 525 of testing this next data item are repeated until the end of a section 295 is identified.

When the end of a section 295 is identified, the step 530 of testing for the end of the data set 200 is applied. Where this test is not satisfied, then the step 535 of incrementing the position value counter is performed and the above process from the step 515 of tagging the start of a section 295 and labelling it with the current value of the position counter is performed.

When an end of a data set 200 is identified, then the annotated data set 200 is stored in the data set store 355.

Alternatively, the data set 200 need not be annotated with section 295 tags and labels. A linked list structure could be used, where each section is stored as an individual element of the linked list. A further alternative is to store each section individually in a dynamically created array.

Applying steps of FIG. 5 to the data set 200 of FIG. 2 produces the result detailed below. In this example, the sectioning rules applied is that each sentence represents a section 295 and each section 295 is labelled, in numerically ascending order, with a position value 280.

TABLE 1

| | |
|---|---|
| 1: | The cat sat on the mat. |
| 2: | A mat, a mat, my kingdom for a mat! |
| 3: | The dog also sat on the mat. |
| 4: | Both cat and dog sat on the mat. |
| 5: | The mat is on the floor. |
| 6: | The night was clear. |
| 7: | I counted the stars that night. |
| 8: | The dog sat on the floor. |

Assigning Ranking Values using Target Data Items

Figure 6:
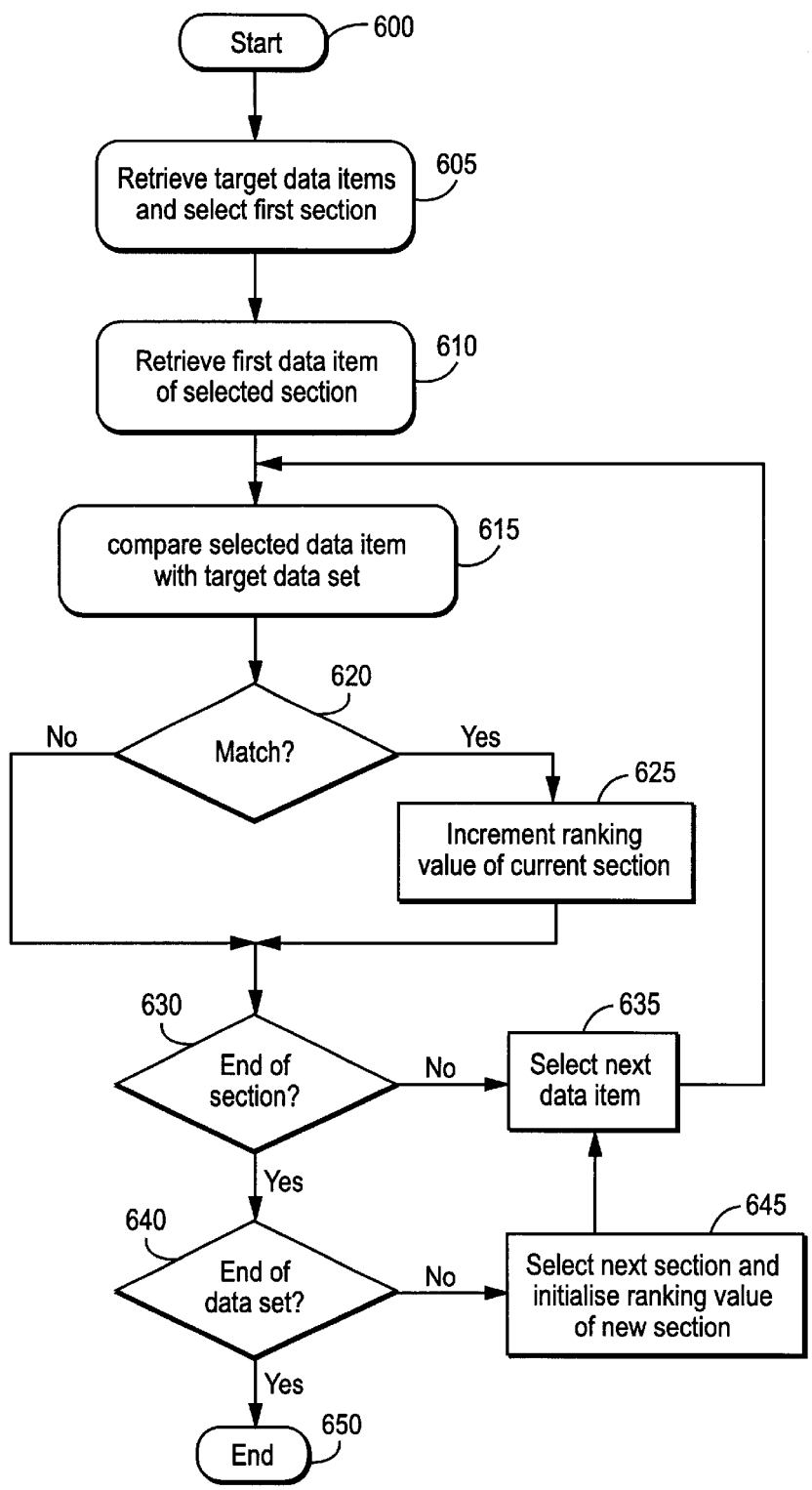
FIG. 6 is a flow chart of steps 410 and 415 in FIG. 4.

FIG. 6 details steps 410 and 415 of FIG. 4 of comparing each section 295 with the target data item set and then assigning ranking values 285 to each section 295. At step 605, the target data items are retrieved from the target data item store 345 and at step 610, the first data item of the first section 295 is retrieved, which is followed by the step 615 of comparing the set of target data items 215 with the selected data item.

Where at step 620 a match is identified by the comparison between the set of target data items 215 and the selected data item, then step 625 of incrementing the ranking value 285 for the current section 295 is performed. Where, at step 620, a match is not identified, then the ranking value 285 for the section 295 is not incremented, and the step 630 of testing for the end of the selected section 295 is performed immediately.

Where the data set 200 has been labelled and tagged during the sectioning process detailed in relation to FIG. 5, these tags may be used to identify the end of a section 295.

Where the results of the step 630 of testing for the end of a section 295 are negative, then the step 635 of selecting the next data item of the data set 200 is performed and the process loops back to perform the step 615 of comparing the selected data item with the set of target data items 215 and to perform the step 625 of incrementing the ranking value 285 of current section 295 (if appropriate) for the newly selected data item.

Where the step 630 of testing for the end of a section 295 is positive, then the step 640 of testing for the end of the data set 200 is performed. Typically, the current data item is compared against the "end of file character" or other standard marker for indicating the end of a data set 200.

Where at step 640 the end of a data set 200 has not been reached, then the step 645 of selecting the next section 295 and initialising a ranking value 285 for the newly selected section 295 is performed. Following this, the step 635 of selecting the next data item of the newly selected section 295 is performed, before looping back to step 615 for the newly selected data item.

In the example data set 200 of FIG. 2, the target data item are "night" and "star". Completing the steps of FIG. 6 for the example data set 200 produces:

TABLE 2

| Section Position Value 280 | Ranking Value 285 | Sentence |
|---|---|---|
| 1 | 0 | The cat sat on the mat. |
| 2 | 0 | A mat, a mat, my kingdom for a mat. |
| 3 | 0 | The dog also sat on the mat. |
| 4 | 0 | Both cat and dog sat on the mat. |
| 5 | 0 | The mat is on the floor. |
| 6 | 1 | The night was clear. |

TABLE 2-continued

| Section Position Value 280 | Ranking Value 285 | Sentence |
|---|---|---|
| 7 | 2 | I counted the stars that night. |
| 8 | 0 | The dog sat on the floor. |

(It should be noted that the above and following description treats the sections 295 of a data set 200 equally. However, some sections may have higher relative importance in the data set 200 and these may be assigned an increased ranking value 285. For instance, headings are identifiable in an HTML file and the processing module 205 may be designed to detect them and increase their ranking value 285.)

Generating a Summary

Figure 7:
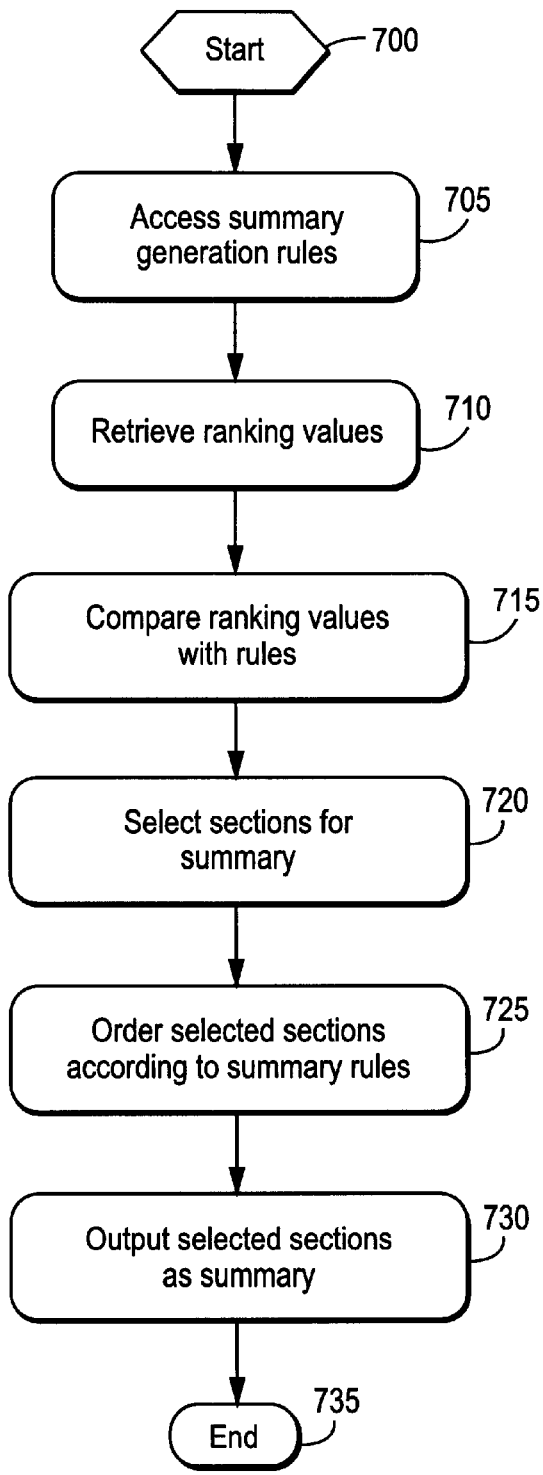
FIG. 7 is a flow chart of step 420 in FIG. 4.

FIG. 7 details the step 420 of FIG. 4 of generating a summary of a data set 200 once the ranking value 285 of each section 295 has been determined.

At step 705, the summary generation rules are accessed by the summarisation control module 305. These rules detail procedures for selecting sections 295 that will make up the summary.

In the present example, the rules select the sections 295 with the highest ranking value 285, in descending order until a summary of predetermined length is generated.

Further embodiments discussed below may use more complex rules.

At step 710, the ranking values 285 of each section 295 are retrieved and compared against the summary rules.

At step 720, those sections 295 conforming to the rules are selected and then the step 725 of ordering the sections 295 in the summary is performed.

At least two ways of ordering the summary is possible, the first is to order the summary according to ranking value 285 in ascending or descending order. The other way is to order the ranking value 285 in section 295 order, ie in the order in which the sections 295 appear in the data set 200.

Following the step 725 of ordering the sections 295 of the summary, the step 730 of outputting or storing the summary, according to processes well known in the art, may be performed.

Under the steps of FIG. 7, the summary of the example data set 200 will consist of sections 6 and 7, namely:

6: The night was clear.

7: I counted the stars that night.

This is because each of these sections 295 have ranking values of 1 and 2. No other sections 295 are included as all of the remaining sections 295 have the same ranking value 285, namely 0.

According to further embodiments discussed below, other sections 295 of the data set 200 may be incorporated into the summary.

Such embodiments have the advantage of generating a summary 235 that is based around sections 295 containing target data items and which has additional sections 295 of the data set 200 which serve to place the summary 235 into context with the overall subject matter of the selected data set 200.

Generating Sets of Key Data Values

Figure 8:
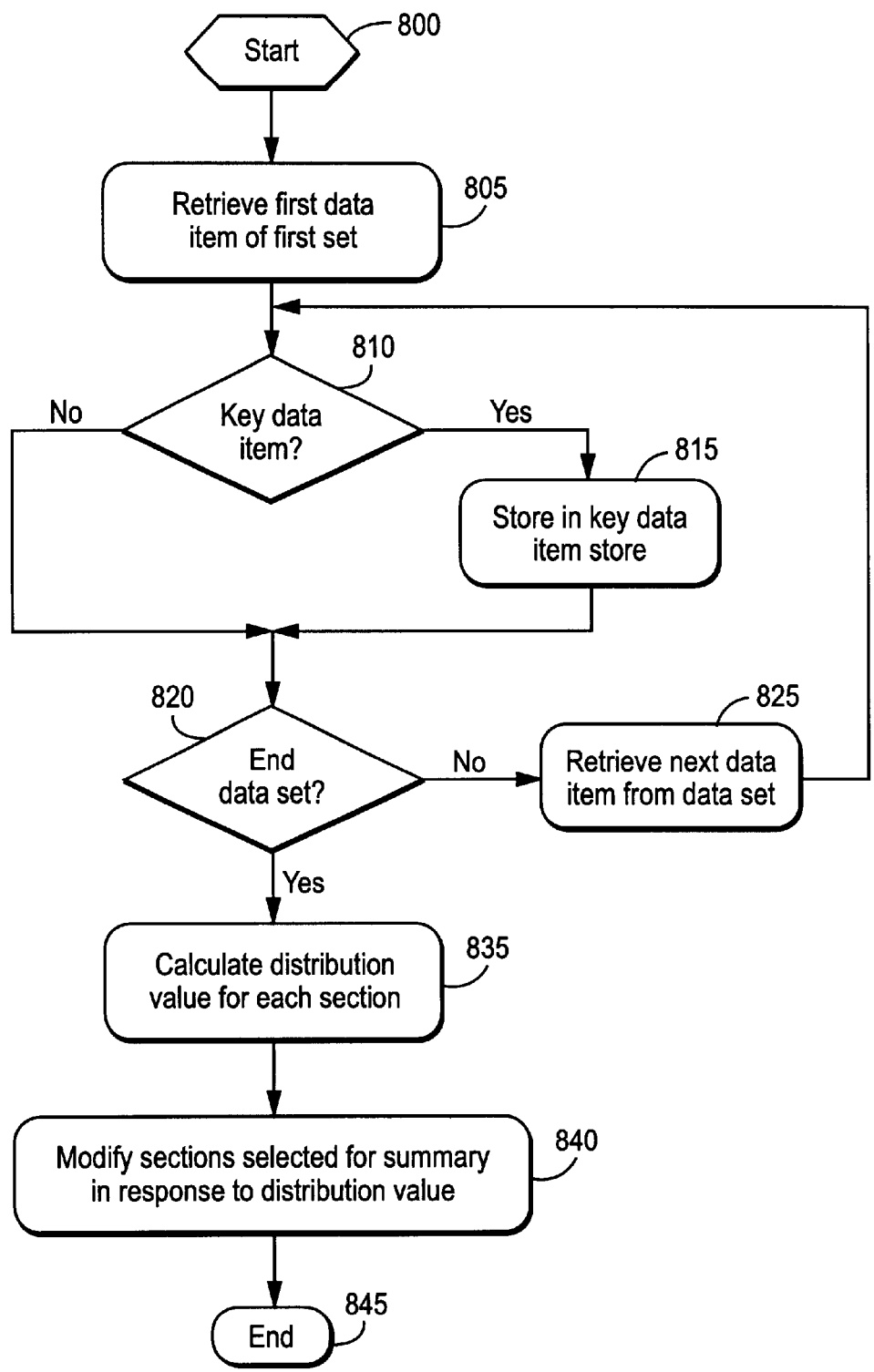
FIG. 8 is a flow chart of additional features that may be incorporated into the embodiment detailed in FIG. 4.
Figure 9:
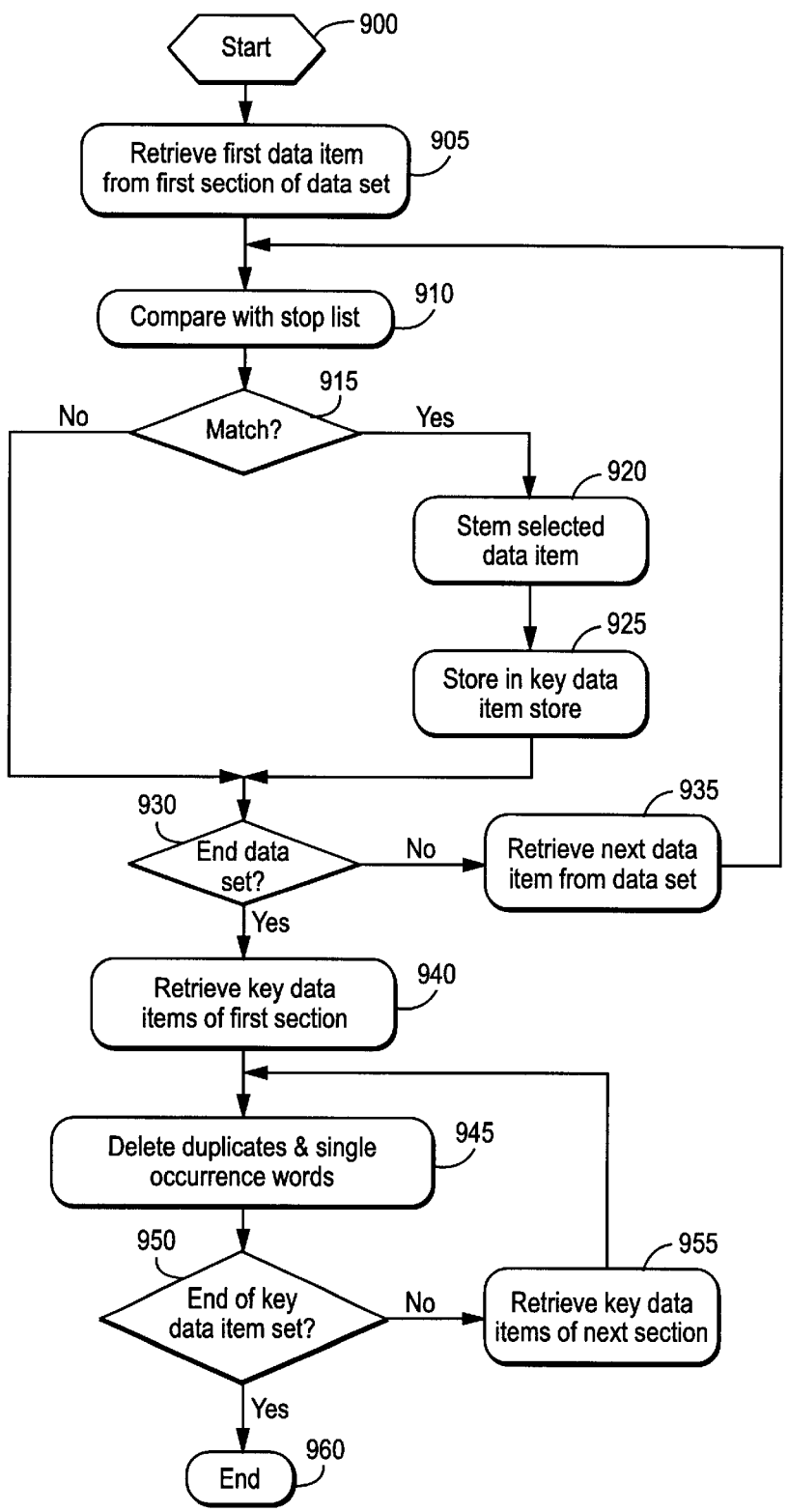
FIG. 9 is a flow chart of additional features that may be incorporated into the embodiment of FIG. 4.
Figure 10:
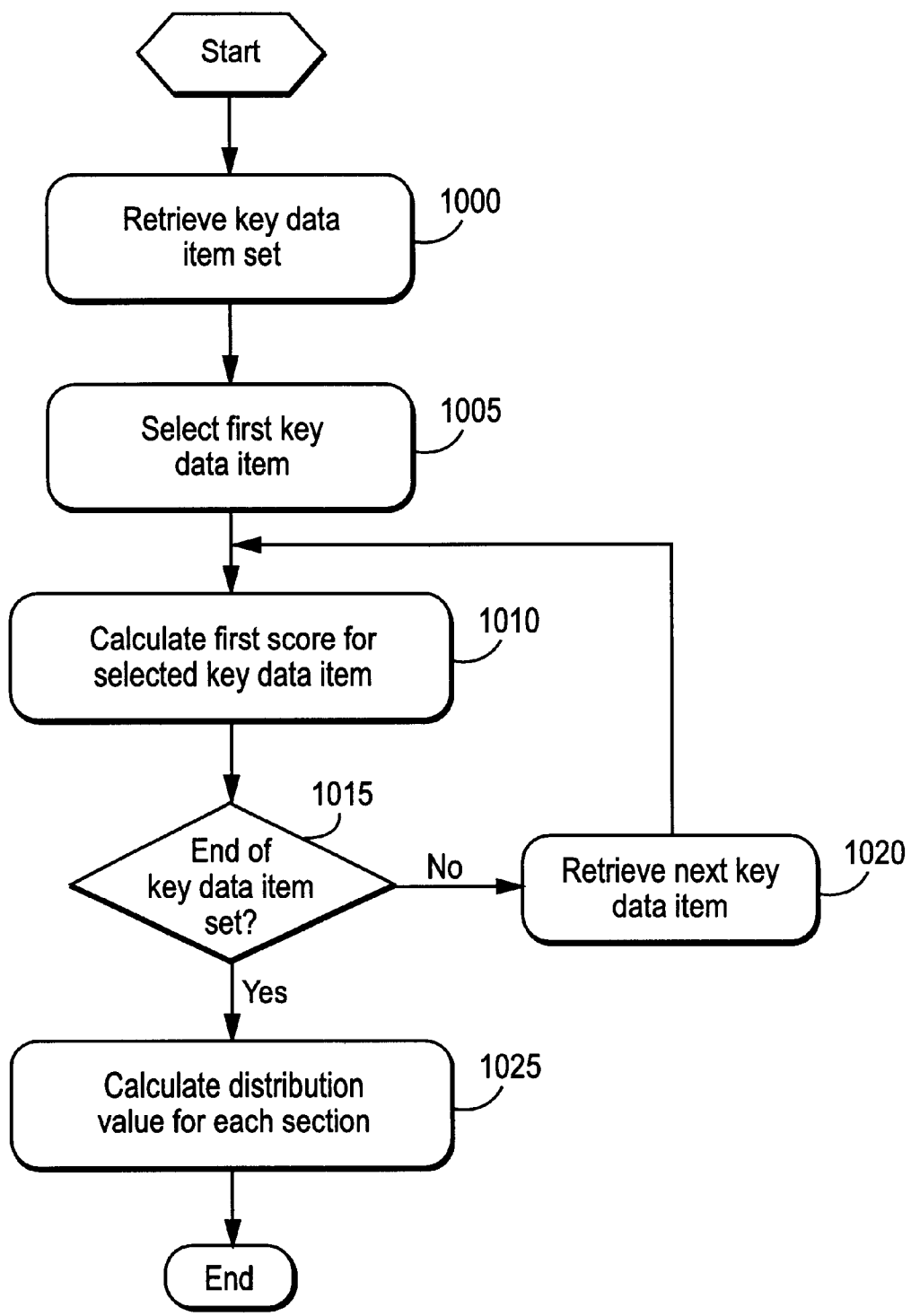
FIG. 10 is a flow chart of step 830 in FIG. 8.

FIGS. 8, 9 and 10 detail certain aspects of a further embodiment enabling the ranking values 285 to be modified in accordance with contextual information of the data set 200. A set of key data items is generated for each data set, key data items being relatively strongly related to the overall subject matter of the data set 200. Each section 295 is reviewed to obtain a distribution value 290 which reflects the proportion of key data items appearing in that section. The distribution values 290 are then used to modify the sections' ranking values 285.

The distribution values 290 can be calculated and modified according to various different rules, as described below, and these are stored in the distribution values rules store 395 for use by the processing module 205. (They may alternatively of course be embedded in the process logic, as mentioned above.)

Referring to FIG. 8, a step in generating a set of key data items for a data set 200 is to take out words with little relevance to the overall subject matter. This can be done using the stop list 210.

At step 805, the first data item of the first section 295 of the data set 200 is accessed and the step 810 of testing whether it is a key data item is performed. Typically, the step 810 of testing for a key data item is to access the stop list 210 in the stop list data store 335. If the selected data item matches a word on the stop list 210, it is not considered to be a key data item.

The stop list typically consists of small value words such as articles and conjunctives that do not tend to reflect the subject matter of the data set 200 being summarised, eg words such as "it", "are", "they", "has", "where", "at", "in", etc, etc.

Where a data item does not match any words on the stop list 210, then the step 815 of storing the data item in the set of key data items 225 in the key data item store 350 is performed. This is done in a manner that serves to identify the section 295 in which each data item was located, for instance by associating the key data items 225 with position values 280.

The step 820 of checking for the end of the data set 200 is then performed with a negative result causing the next data item of the data set 200 to be accessed from the data set store 355. The step 810 of identifying a key data item 225 and the step 815 of storing the key data item in the key data item store 350 are then repeated for each next data item until the end of the data set 200 is reached.

The step 835 of calculating a distribution value for each section 295 in the data set 200 is then performed, in relation to the key data items 225. This calculation of distribution values is more fully described below with reference to FIG. 10.

Alternate embodiments can identify a set of key data items 225 in different ways and thus arrive at different distribution values 290. For instance, additional steps are described in relation to FIG. 9.

The purpose of calculating distribution values of key data items is to determine those sections 295 that reflect the subject matter of the selected data set 200 as a whole to a greater degree than other sections 295. Those sections 295 that more strongly reflect the subject matter of the data set 200 as a whole may then be incorporated into the summary.

The distribution value 290 serves at step 840 as a mechanism for refining ranking values 285 and aids in the selection of sections 295 to be included in the summary. Refining the ranking values is more particularly described below with reference to FIGS. 10 to 15.

According to the example data set 200, the target data items are "night" and "star". The process of FIGS. 7 and 8 then produces the following key data item set 225 with ranking values 285 and position values 280:

TABLE 3

| Section Position value 280 | Ranking Value 285 | Key Data Items 225 |
|---|---|---|
| 1 | 0 | cat, sat, mat |
| 2 | 0 | mat, mat, kingdom, mat |
| 3 | 0 | dog, sat, mat |
| 4 | 0 | cat, dog, sat, mat |
| 5 | 0 | mat, floor |
| 6 | 1 | night, clear |
| 7 | 2 | counted stars night |
| 8 | 0 | dog sat floor |

FIG. 9 details further steps which can be used in generating a set of key data items 225. The primary differences between FIG. 8 and FIG. 9 is the step 920 of stemming key data items and the step 945 of deleting duplicate and singleton data items from the key data item set 225.

The step 920 of stemming key data items has the effect previously discussed in relation to Porter's Algorithm of reducing key data items to a basic form. This step provides increased accuracy in calculation of distribution values 290 in that various grammatical forms of key data items such as nouns, adjectives and plurals will each form a match with a specified target data item thereby increasing the ranking value of the section 295.

Duplicate key data items are those which occur more than once in a section 295. The step 945 of deleting duplicate occurrences of key data items in any one section 295 of the data set 200 from the key data item set 350 may be counter-intuitive at first sight. However, it has been found that sections with several different key data items 225 can be more relevant to the overall subject matter of a data set 200 than sections with one key data item repeated.

Singleton key data items occur only once in the whole data set 200. These are also deleted from key data items.

Applying this process to the processed data set 200 in Table 3 above results in:

TABLE 4

| Section Position Value 280 | Ranking Value 285 | Key Data Items 225 |
|---|---|---|
| 1 | 0 | cat, sat, mat |
| 2 | 0 | mat |
| 3 | 0 | dog, sat, mat |
| 4 | 0 | cat, dog, sat, mat |
| 5 | 0 | mat, floor |
| 6 | 1 | night |
| 7 | 2 | night |
| 8 | 0 | dog sat floor |

Note that this embodiment assumes that the position of data items within a section 295 is insignificant. Note also that duplicates of "mat" have been eliminated from section 2 and that "kingdom", "counted" and "stars" have all been eliminated from the key data item set 350 because they only occur once in the data set 200.

The ranking values 285 of course remain unchanged at this stage.

Distribution Values

FIG. 10 is a flow chart of the step 830 in FIG. 8 for calculating a distribution value 290 for each section 295.

For each section, it comprises a number of steps, namely step 1005, step 1015 and step 1020, which together comprise a loop for accessing in turn each of the key data items stored in the key data item store 350.

This loop bounds the step 1010 of calculating a first score for each key data item. This first score consists of the number of times that the key data item of consideration occurs in every other section 295 of the key data set 200 apart from the current section 295. (Of course, where duplicate key data items have been deleted, as in step 945, the first score cannot be higher than the total number of sections minus one.)

Once the step 1010 of calculating a first score for each key data item has been performed for the first section, steps 1005, 1010, 1015 and 1020 are repeated for each subsequent section (not shown).

The process then moves on to perform the step 1025 of calculating a distribution value 290 for each section 295. This is performed by summing, for each section 295, the first scores of each key data item in the section 295.

This distribution value 290 reflects the number of times that each of the key data items of a section 295 occurs in other sections 295 of the data set 200, the assumption being that the more frequently a data item occurs, the more important it is to the subject matter of the selected data set 200.

Table 5 shows the results of applying the steps of FIG. 10 to the example data set 200 of FIG. 2. It results for instance in the last section 295 having a distribution value of "6" because "dog" occurs twice elsewhere, "sat" three times and "floor" once:

TABLE 5

| Section Position Values 280 | Ranking Value 285 | Key Data Items 225 | Distribution Values 290 |
|---|---|---|---|
| 1: | 0 | cat sat mat | 8 |
| 2: | 0 | mat | 4 |
| 3: | 0 | dog sat mat | 9 |
| 4: | 0 | cat dog sat mat | 10 |
| 5: | 0 | mat floor | 5 |
| 6: | 1 | night | 1 |
| 7: | 2 | night | 1 |
| 8: | 0 | dog sat floor | 6 |

The above step 1010 of calculating a first score for each key data item may be calculated in a different manner, namely as the sum of the total number of times that each key data item occurs in the key data items set less one.

The distribution values 290 for each section are then used to modify the ranking values 285 and thereby modify the summary produced.

Typically, a number of sections 295 will have the same ranking value. This is because the ranking value is an integer value of the number of target data items in the selected section 295. The distribution values 290 serve as a measure for ordering those sections 295 with the same ranking value 285.

One approach to using the distribution values 290 to modify the ranking values 285 is to divide each distribution value 290 by ten, or one hundred (whatever is appropriate), so that each distribution value 290 is reduced to a decimal value, which can then be added to each ranking value.

In the present example, this produces:

TABLE 6

| Section Position Values 280 | Ranking Value 285 | Key Data Items 295 | Distribution Values 290 | Modified Ranking Values |
|---|---|---|---|---|
| 1: | 0 | cat sat mat | 8 | 0.8 |
| 2: | 0 | mat | 4 | 0.4 |
| 3: | 0 | dog sat mat | 9 | 0.9 |
| 4: | 0 | cat dog sat mat | 10 | 1.0 |
| 5: | 0 | mat floor | 5 | 0.5 |
| 6: | 1 | night | 1 | 1.1 |
| 7: | 2 | night | 1 | 2.1 |
| 8: | 0 | dog sat floor | 6 | 0.6 |

Data Item Second Score

Figure 11:
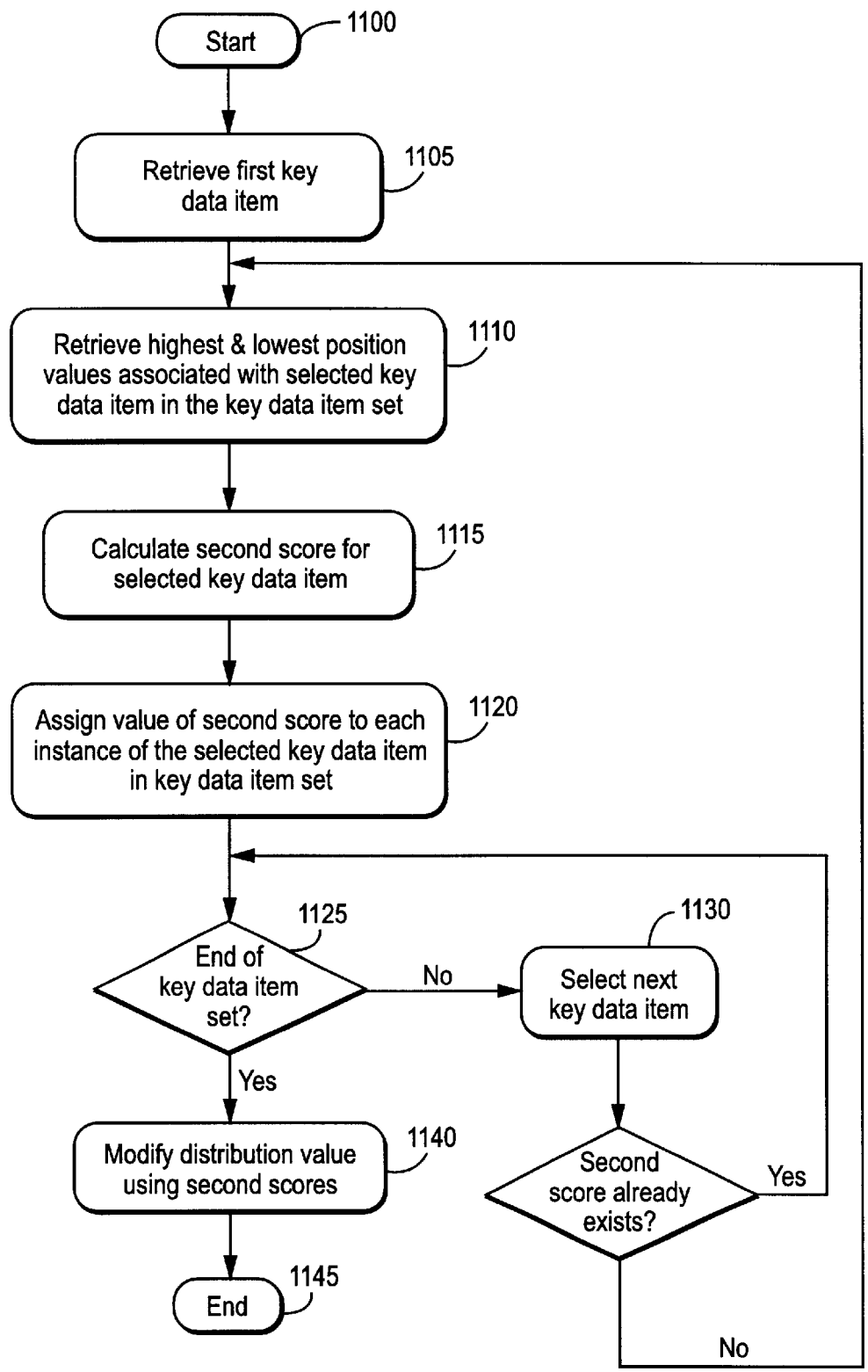
FIG. 11 is a flow chart of additional features that may be incorporated into step 830 of FIG. 8.

FIG. 11 is a flow chart of the additional feature of calculating a second score for each key data item that may be incorporated into step 830 of FIG. 8. This second score may then be used to modify the distribution values 290 of each section 295 calculated above or may be used separately to calculate new distribution values 290.

The process of FIG. 11 represents an alternate measure of the distribution of key data items within the key data items set.

The process of FIG. 1 1 commences with the step 1 105 of retrieving the set of key data items 225 from the key data item store 350 and then proceeds through a number of calculation steps, namely steps 1110, 1115 and 1120 before proceeding through control loop tests that ensure that these calculation steps 1110, 1115 and 1120 are performed on each key data item.

The calculation steps 1110, 1115 and 1120 operate to calculate the second score for each key data item. This second score is identical for each occurrence of a key data item in the data set 200. Accordingly, it need only be calculated once for each of the key data items in the key data item set 225. In step 1120, once it has been calculated the second score is assigned to each occurrence of the key data item in the set 225.

The second score is calculated as the greatest separation between occurrences of the key data item in the set of key data items 225. This is calculated by first performing the step 1110 of identifying and retrieving the highest position value [assigned at step 515 of FIG. 5] and the lowest position value of a key data item in the set of key data items 225. This is followed by the step 1115 of subtracting the lowest position value from the highest position value for the selected key data item.

FIG. 11 is similar to FIG. 10 in that an operation is performed on each key data item which operation refers to all of the key data items in the set of key data items 225.

However, the control loop in FIG. 11 is different to FIG. 10. It can be a more efficient process than FIG. 10 depending on the specific implementation and method of accessing the set of key data items in the key data item store 350.

The control loop step 1125 tests for the end of the key data item set 225, for instance by looking for the presence of a next data. If the result is positive, then the next key data item is selected. If the second score has already been calculated (step 1150) for the selected key data item, due to the occurrence of an identical key data item in a previous section 295 of the data set 200, then the process returns to step 1125 to look for a next data item. If the selected data item does not have a second score, then the process returns to steps 1110, 1115 and 1120 on the selected key data item.

Table 7 shows the results of applying the steps of FIG. 11 to the key data items from the example data set 200.

Referring to Table 7, this produces for instance a second score of seven for the key data item "sat" since it occurs first in section 1 and last in section 8, with 8 minus 1 equalling 7.

TABLE 7

| key data item | second score |
|---|---|
| cat | 3 |
| sat | 7 |
| mat | 4 |
| dog | 5 |
| floor | 3 |
| night | 1 |

Once step 1125 has been completed and the second scores have been calculated for each key data item, the step 1140 of using the key data items to modify the distribution value 290 of each section 295 can be performed.

This may be achieved by summing the second scores for each section 295 and using the result to further refine the ordering of the sections 295. This may be in addition to the distribution value 290 calculated in FIG. 10 or it may be used instead of this distribution value 290. For instance, referring above to Table 5, the second scores for each section could be added to the first scores to give the distribution values 290 prior to division.

The advantage of using second scores is that it can be the case that key data items 225 are more relevant to the subject matter of the data set 200 when they re-occur far apart in the data set 200.

Adjustment Value Generation

Figure 12:
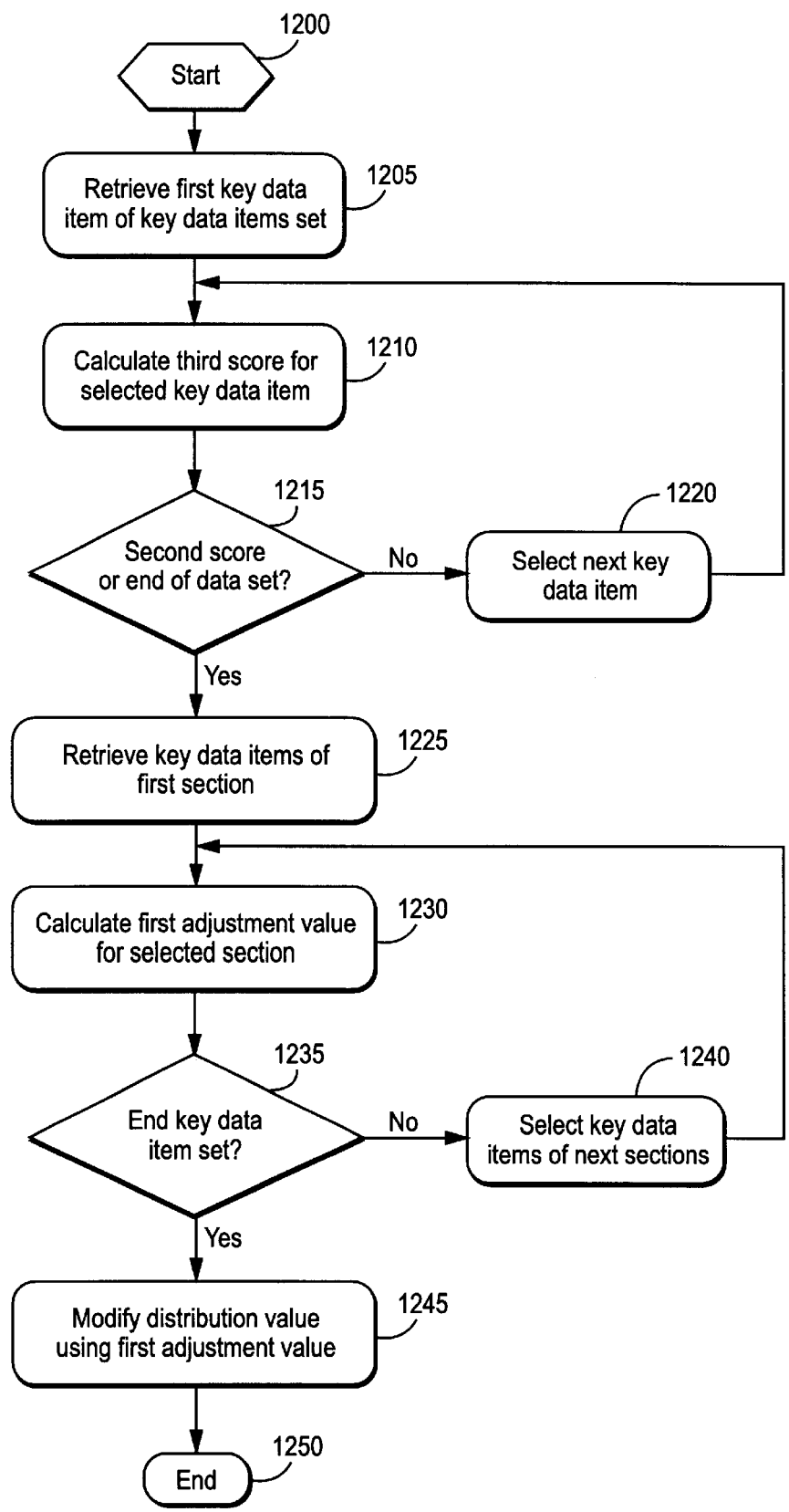
FIG. 12 is a flow chart of additional features that may be incorporated into step 830 of FIG. 8.

FIG. 12 details additional steps that may be incorporated into step 830 of FIG. 8. The steps detailed in FIG. 12 calculate a value for each section 295 that may be used for adjusting the distribution value 290. It is called the first adjustment value and is calculated using the first and second scores for each key data item, and a third score for each key data item calculated under the step 1210 of FIG. 12.

The process of FIG. 12 also has two control loops. The first loop ensures that the step 1210 of calculating a third score is performed for each key data item of the data set 200 and the second control loop ensures that the step 1230 of calculating the first adjustment value is performed for each section 295.

The process of FIG. 12 commences with the step 1205 of accessing the first key data item in the first section 295.

The first loop is then commenced with the step 1210 of calculating a third score for the selected key data item. The calculation is performed by identifying every pair of sections 295 in which the key data item of consideration co-occurs, subtracting the lower position value from the higher position value for each of said pairs of sections. The result of the subtraction for each pair is then divided by the second score of the key data item of consideration. Each of these values is then summed for the key data item of consideration, resulting in the third score for the key data item of consideration.

Once the third score is calculated for each key data item, the second control loop is entered, which operates so as to calculate the first adjustment value for each section 295 of the data set 200.

The first adjustment value for each section 295 of the key data set 200 is calculated at step 1230 as the sum of the third score of each key data item in the selected section 295.

The above process may be better represented using the following pseudo code:

for each section S
  set its adjustment value to zero
for each key data item
  for every pair of sections (i, j), where i>j, that the key data item occurs in
    add (i-j)/Sd to the adjustment values of sections $s_i$ and $s_j$ (For the purposes of the above pseudo code and following description, "Sd" means second score and "Wd" means distribution value.)

Referring back to Table 3 above, consider Section 8 of the example data set 200. The key data item "dog" has a second score of 5(=8–3). The occurrence of "dog" in sentences 3 and 4 contributes:

$$(8-3)/5+(8-4)/5=1.8$$

Repeating these operations for the words "sat" and "floor" yields the first adjustment value for Section 8 as:

$$(8-3)/5 + (8-4)/5 + (8-1)/7 + (8-3)/7 + (8-4)/7 + (8-5)/3 = 5.09 \text{ (approx)}$$
$$\text{"dog"} \quad \text{"dog"} \quad \text{"sat"} \quad \text{"sat"} \quad \text{"sat"} \quad \text{"floor"}$$

The result of this process is, like the use of the second scores described above, that links between words in sentences widely spaced through a data set 200 are favoured. It is assumed that wide spacing indicates that a concept contributes more significantly to the subject matter of the data set 200.

FIG. 12 is concluded with the step 1245 of modifying the distribution value 290 of each section 295 using the first adjustment value. This may be performed in a similar manner to the step 1140 of FIG. 11 for the second scores of the key data items.

Figure 13:
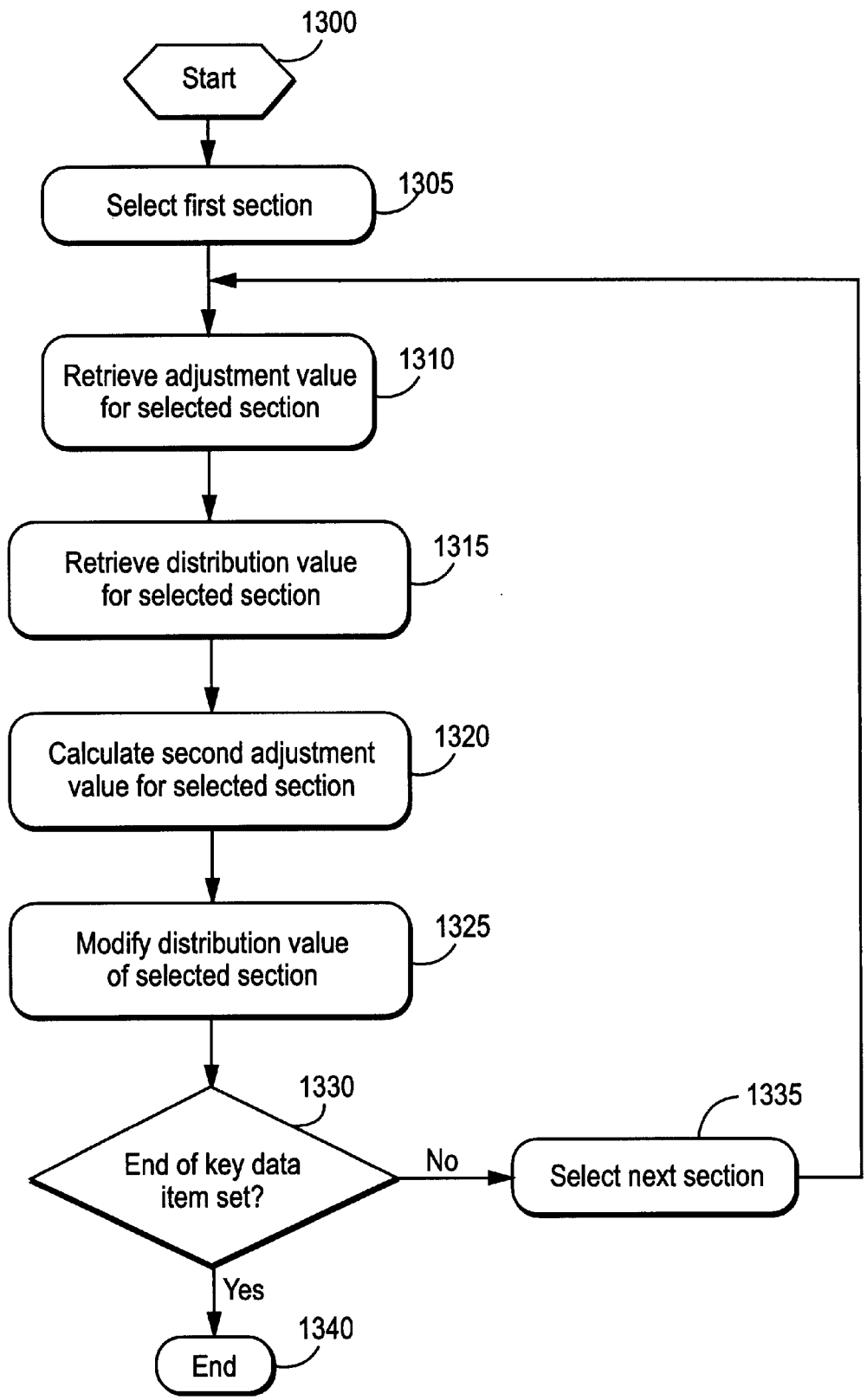
FIG. 13 is a flow chart of additional features that may be incorporated into step 830 of FIG. 8.

FIG. 13 details additional steps that may be incorporated into steps 820 of FIG. 8. The steps determine a further distribution pattern for the key data items of the data set 200. This further distribution pattern is measured using a second adjustment value.

FIG. 13 comprises a control loop to ensure that each section 295 has a second adjustment value calculated.

The calculation of the second adjustment value commences with the step 1310 of accessing the first adjustment value of the selected section 295 and the step 1315 of accessing the distribution value 290 of the selected section 295.

The second adjustment value is then calculated at step 1320 by dividing the first adjustment value by the square root of the distribution value 290.

It is preferable to perform this normalisation so that longer sentences do not get proportionately higher scores than shorter sentences. It has been found that dividing by $\sqrt{W_d}$ provides preferred results to dividing by $W_d$ alone.

Applying this to the example data set 200 and referring to FIG. 5 above, the second adjustment value for section 8 is calculated as:

$$5.09/\sqrt{6}=2.08 \text{(approx)}.$$

At step 1325, the distribution value 290 is modified by the second adjustment value.

One method for this is to replace the old distribution value 290 with the second adjustment value, though other methods similar to those detailed above in relation to FIGS. 11 and 12 are also possible.

Figure 14:
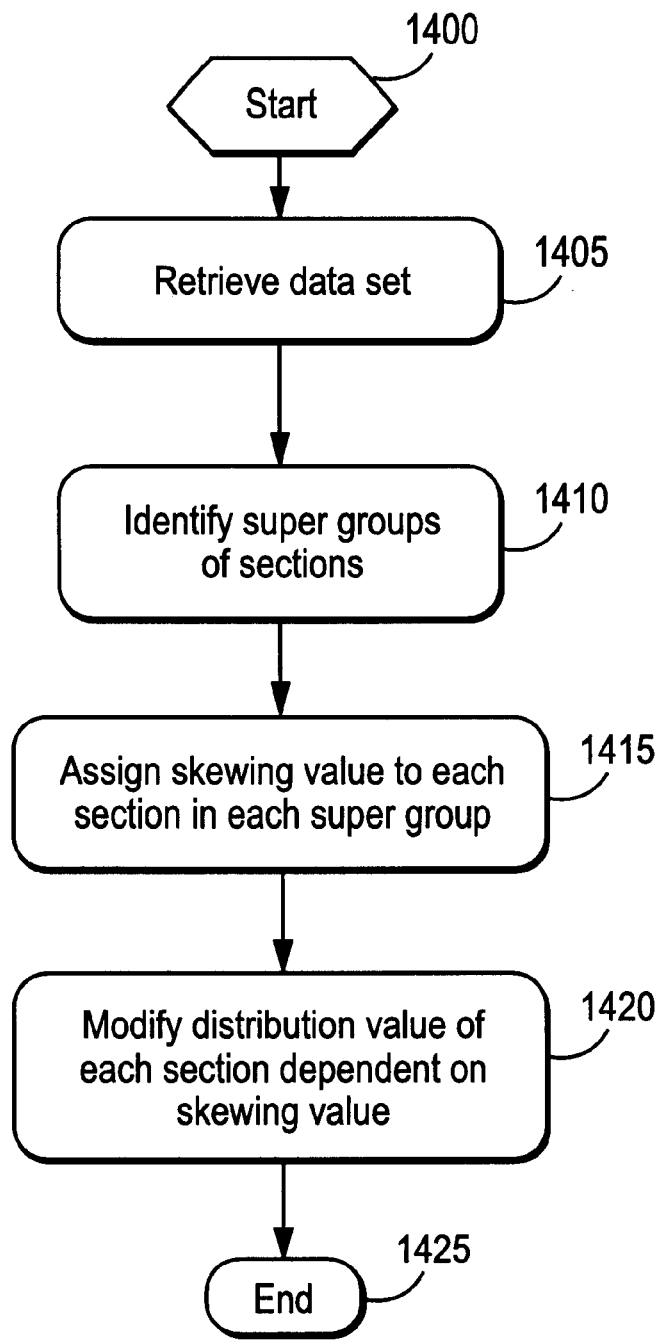
FIG. 14 is a flow chart of additional features that may be incorporated into step 830 of FIG. 8.

FIG. 14 details additional steps that may be incorporated into step 830 of FIG. 8. These steps define a skewing value for each section 295. The skewing value of each section 295 is used to modify the distribution value 290 of each section 295.

FIG. 14 commences with the step 1405 of accessing the data set 200 and section information. It then proceeds with the step 1410 of identifying super groups of sections 295 within the data set 200. The super group may take various forms, for example where each section 295 corresponds to a sentence then the supergroups may be the paragraphs of the data set 200. Alternatively, where the sections 295 are paragraphs, then the supergroups of the data set 200 may be pages or chapters of the data set 200.

In the example data set 200 of FIG. 2, a supergroup 1 comprises sections 1, 2, 3, 4 and 5 and a supergroup 2 comprises sections 6, 7 and 8.

The skewing value is assigned to each section 295, at step 1415, according to the position of the section 295 within its supergroup, with earlier sections 295 being favoured more highly.

The preferred scheme is:

section 1: skewing value=1.2 section 2: skewing value=1.1 section 3: skewing value=1.05 section 4: skewing value=1.025 etc

The distribution value 290 of each section 295 is then modified according to the step 1420 of multiplying the distribution value 290 by the skewing value.

Where the embodiment of FIG. 13 is used for the distribution value 290 of section 8, the following multiplication is performed:

$$2.08 * 1.05 = 2.18 (approx)$$

The value 1.05 is used as the skewing value because sentence 8 is the third sentence in the second supergroup of the data set 200.

This skewing operates on the assumption that the most significant information in a paragraph is often found near its start.

A similar skewing value may also be applied to each supergroup of a data set 200:

supergroup 1: each section is multiplied by 1.2 supergroup 2: each section is multiplied by 1.1 supergroup 3: each section is multiplied by 1.05 supergroup 4: each section is multiplied by 1.025 etc

Thus the distribution value for section 8 becomes:

$$2.18 * 1.1 (=2.39 approx)$$

because section 8 is in the second supergroup of the data set 200.

Applying the steps of FIG. 13 and FIG. 14 yields the following (approximate) skewed distribution values 290:

TABLE 8

| Section | Skewed Distribution Values |
| --- | --- |
| 1: | 2.65 |
| 2: | 1.16 |
| 3: | 1.61 |
| 4: | 1.90(3) |
| 5: | 1.90(2) |
| 6: | 1.32 |
| 7: | 1.21 |
| 8: | 2.39 |

Summary Length and Section Rating (Fine Gradation)

Figure 15:
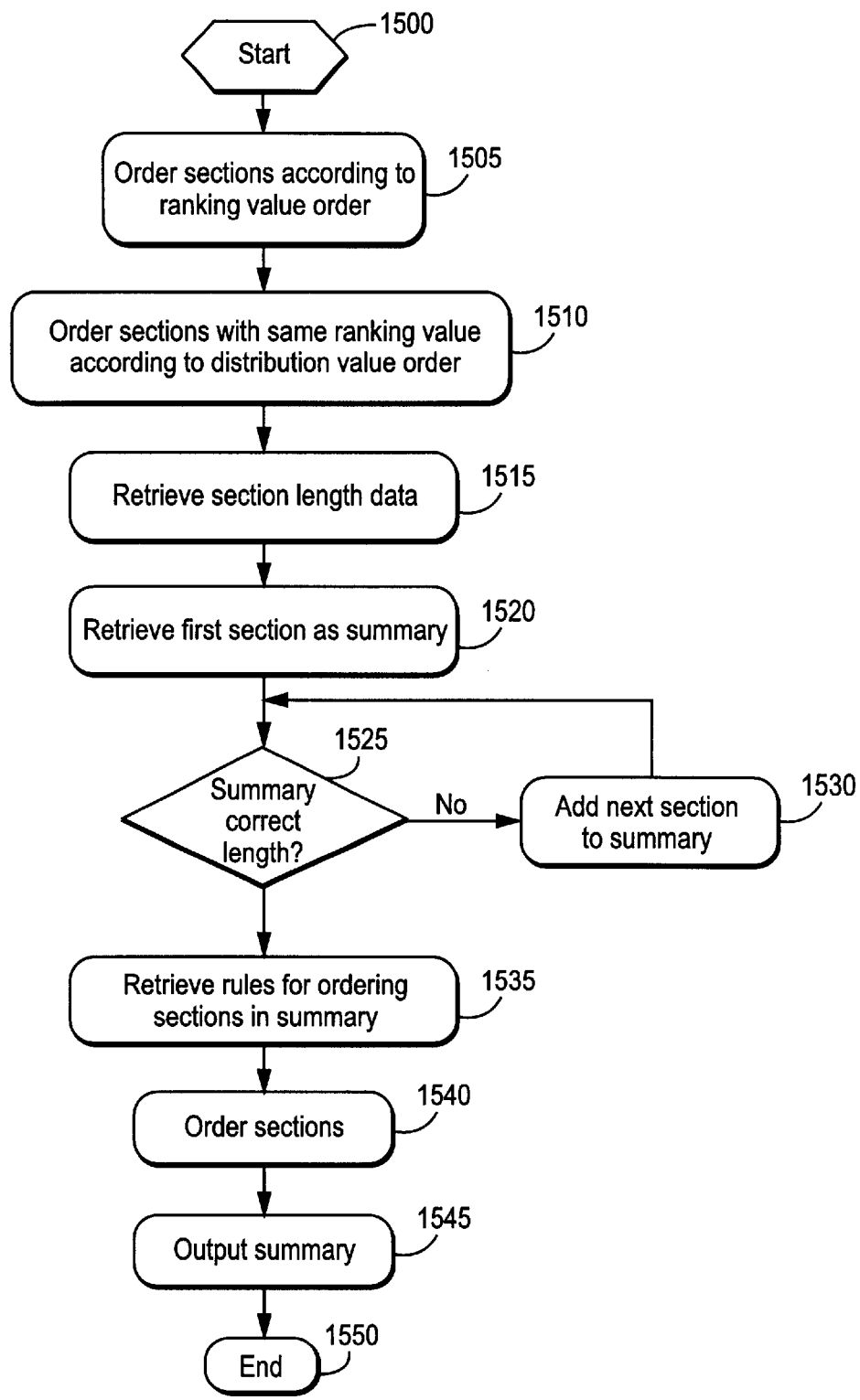
FIG. 15 is a flow chart of additional features that may be incorporated into step 420 of FIG. 4.

FIG. 15 is a flow chart of additional steps that may be incorporated into the step 420 of FIG. 4 of producing summaries.

It commences with the step 1505 of ordering the sections 295 in numerically descending order according to their ranking value which is followed by the step 1510 of ordering sections 295 with the same ranking value according to their distribution values 290.

Once the sections 295 are ordered, summary length data, specified by a user or external application or, in the absence of such, a default value of summary length is retrieved from summarisation control module 305.

The section 295 with the highest ranking value (and highest distribution value 290 if more than one section 295 have the same ranking value) is then retrieved at step 1520 and the length of the section 295 calculated. This length is then stored against a summary length counter and at step 1525 the length of the summary is compared against the specified length.

Where the length does not meet summary length requirements, the next highest ranked section 295 is selected at step 1530 and its length computed and again added to the length of the previously calculated summary before repeating the summary length test of the step 1525.

Once the sections 295 that comprise a summary of sufficient length are identified, the step 1530 of applying summary ordering rules is performed. These rules specify if the summary is to be generated according to ranking value order or position value order. Once the step 1540 of ordering of the sections 295 according to the summary ordering rules has been performed, the step 1545 of outputting the summary is then performed.

Other embodiments may not consider section length when generating a summary. These embodiments select a threshold value above which all sections 295 are reproduced in the summary. An example of such is a summary that reproduces a percentage value of the data set 200.

An example of this method appears below using the present example data set 200 and the results of FIGS. 13 and 14.

For simplicity, each section 295 is provided with an integer value corresponding to its position in the list of distribution values 290. For example, there are 8 sections 295 in the present example and accordingly each section 295 is assigned a value, referred to below as a "Rating", between 1 and 8, so that the sections 295 are ordered in the same order as that determined by the distribution values 29

TABLE 9

| Section | Rating (fine gradation) |
| --- | --- |
| 1: | 8 |
| 2: | 1 |
| 3: | 4 |
| 4: | 6 |
| 5: | 5 |
| 6: | 3 |
| 7: | 2 |
| 8: | 7 |

These ratings may be used to provide summaries of all possible lengths, by varying a threshold value for these Ratings, and only including sections 295 with ratings at or above the threshold.

In some embodiments, for example where detail in the summary is more important than length, the gradation in this rating technique above may be too fine (meaning some detail may be lost) in which case a coarser rating system, as described below, may be used.

Section Rating (Coarse Gradation)

With a coarse Rating scheme, the number of unique section ratings is collapsed into a smaller number, so that summaries of approximately ½, ¼, ⅛ etc of the original document length (with a lower limit of two sections 295) are produced.

For the example verse, the mapping from fine rating to coarse rating is:

fine: 8 7 6 5 4 3 2 1
coarse: 3 3 3 2 2 1 1 1 giving the coarse sentence ratings as:

TABLE 10

| section | section rating (coarse gradation) |
| --- | --- |
| 1: | 3 |
| 2: | 1 |
| 3: | 2 |
| 4: | 3 |
| 5: | 2 |
| 6: | 1 |
| 7: | 1 |
| 8: | 3 |

Thus selecting a threshold rating of 2 would produce a summary containing sentences 1, 3, 4, 5 and 8 being:

The cat sat on the mat.
The dog also sat on the mat.
Both cat and dog sat on the mat.
The mat is on the floor.
The dog sat on the floor.

However, this summary has not accounted for target data items. To account for target data items, the ratings of all sections 295 containing words or phrases that match the target data items are increased sufficiently to exceed the scores of all other sections 295. In the case where there is more than one word or phrase in the target data items, all sentences containing N+1 matches to the target data items have their ratings increased sufficiently to exceed the ratings of all sections 295 containing N matches to the target data items.

In the example data set 200, if the data items of "night, star" are used, the rating of sentence 6 (containing "night") under the coarse gradation system is increased from 1 to 4, and the rating of sentence 7 (containing both "night" and "star") is increased from 1 to 5. Differences in original gradation are preserved when promoting ratings to take account of the target data items.

In the example, the coarse section 295 ratings become:

TABLE 11

| Section | sentence rating (coarse gradation) |
| --- | --- |
| 1: | 3 |
| 2: | 1 |
| 3: | 2 |
| 4: | 3 |
| 5: | 2 |
| 6: | 4 |
| 7: | 5 |
| 8: | 3 |

Thus selecting a threshold rating of 3 would produce a summary containing sections 1, 4, 6, 7 and 8.

The cat sat on the mat.
Both cat and dog sat on the mat.
The night was clear.
I counted the stars that night.
The dog sat on the floor.

Accounting for target data items in this manner allows a summary 235 to be produced that accounts for not only the target data items occurring within a data set 200 but it also places this summary 235 into context with the subject matter of the entire data set 200.

Preferred embodiments may be built using the Java programming language well known in the art and available from Sun Microsystems, CA, USA. It is widely used for applications related to Internet browsers and servers. In such an embodiment, as mentioned above, the summariser 100 may receive a URL as input. The summariser may then request the viewer 135 to download the URL to summariser 100. Once downloaded, the summariser may then proceed to summarise the data set 200 of the URL.

Where the summary contains a sentence with an HTML tag in it, then it is preferable that the immediately preceding sentence be forcibly included in the summary 235. This may be achieved in a post processing step, which commences by scanning the summariser's output to detect HTML tags.

A further post processing step is to review the opening of each sentence. Where it commences with words and phrases such as "Also", "Furthermore", "In addition", "However" [if followed by a comma], "He", "She", then the preceding sentence is preferably forcibly included into the summary 235.

Removal of a sentence from a data set 200 for the generation of a summary may cause quotation marks in the summary to become incomplete. This may be detected by the post processing step of forward and reverse scanning of the summary. Where an open quotation is found, the original data set 200 is referred to and the last sentence in the quote has quotation marks appended.

For example, assume the data set 200 is:

(1) He said, "The project has finished.
(2) We must celebrate our success.
(3) Everyone will receive a token gift."
(4) The project was then closed.

Assuming that this produces a summary with sentences 1, 2 and 4, the summary produced would read as:

(1) He said, "The project has finished.
(2) We must celebrate our success."
(4) The project was then closed.

Note the appended quotation marks at the end of sentence 2.

What is claimed is:

1. Apparatus for summarizing data sets, the apparatus comprising:

an input for receiving a data set to be summarized;

sectioning means for dividing said received data set into plural sections according to pre-determined criteria;

ranking means operable for each said section to compare data within the said section with one or more target data items and for calculating a ranking value for the said section, said ranking value being dependent on the outcome of said comparisons for the said section; and compiling means for compiling a customized summary of the data set by selecting one or more of said one or more sections according to their respective ranking values.

2. Apparatus as in claim 1, including a user input for entering target data items.

3. Apparatus as in claim 1 further including:

means for identifying one or more key data items in each said section according to a pre-determined stop list;

calculating means operable for each said section to calculate one or more distribution values, each said distribution value representing a different pre-determined measure of the distribution, in said data set, of key data items identified in the said section; and adjustment means for adjusting said ranking value for each said section according to the respective said one or more distribution values.

4. Apparatus as in claim 3, wherein:

said calculating means are operable to calculate a first distribution value for each said section, said first distribution value representing a measure of the number of sections of said data set, other than the said section, containing key data items of the said section, said first distribution value, as calculated for the said section, being proportional to the sum of the values of said measure of the number of sections determined for each key data item of the said section.

5. Apparatus as in claim 4 wherein:

said calculating means are operable to calculate a second distribution value for each said section, said second distribution value representing a measure of the separation between the first occurrence within said data set of each key data item of the said section and the respective last occurrence, said second distribution value, as calculated for the said section, being proportional to the sum of the values of said measure of separation determined for each key data item of the said section.

6. Apparatus as in claim 5, wherein:

said selecting means are arranged to compile a summary having a pre-defined length by selecting, in order of decreasing rank, as determined by the corresponding ranking value, one or more of said one or more sections, beginning with the highest ranked section, and adding each selected section to the summary until the summary has attained said pre-defined length.

7. Apparatus as in claim 3, wherein:

said calculating means are operable to calculate a second distribution value for each said section, said second distribution value representing a measure of the separation between the first occurrence within said data set of each key data item of the said section and the respective last occurrence, said second distribution value, as calculated for the said section, being proportional to the sum of the values of said measure of separation determined for each key data item of the said section.

8. Apparatus as in claim 1, wherein:

said selecting means are arranged to compile a summary having a pre-defined length by selecting, in order of decreasing rank, as determined by the corresponding ranking value, one or more of said one or more sections, beginning with the highest ranked section, and adding each selected section to the summary until the summary has attained said pre-defined length.

9. A method for generating a customised summary of a data set, the method comprising:

i) receiving, as input, a data set to be summarized;

ii) dividing said data set into sections according to pre-determined criteria;

iii) comparing data items in each said section against one or more target data items;

iv) calculating a ranking value for each said section in dependence upon the outcome of the respective said comparisons; and v) compiling a customized summary of said data set by selecting one or more of said one or more sections according to their respective ranking values.

10. A method as in claim 9 further comprising:

a) identifying key data items within each said section from step ii) according to a pre-determined stop list;

b) calculating, for each said section, one or more distribution values each representing a pre-determined measure of the distribution of the key data items of the said section in said data set; and c) adjusting said ranking value form step iv) for each said section in dependence upon the respective said one or more distribution values.

11. A method as in claim 10, wherein:

at step b), said one or more pre-determined measures of distribution include a measure of the number of sections of said data set, other than the said section, containing key data items of the said section; and the corresponding distribution value, as calculated for the said section, is proportional to the sum of the values of said measure of the number of sections determined for each key data item of the said section.

12. A method as in claim 11 wherein:

at step b), said one or more pre-determined measures of distribution include a measure of the separation between the first occurrence within said data set of each key data item of the said section and the respective last occurrence; and the corresponding distribution value, as calculated for the said section, is proportional to the sum of the values of said measure of separation determined for each key data item of the said section.

13. A method as in claim 8 wherein:

at step b), said one or more pre-determined measures of distribution include a measure of the separation between the first occurrence within said data set of each key data item of the said section and the respective last occurrence; and the corresponding distribution value, as calculated for the said section, is proportional to the sum of the values of said measure of separation determined for each key data item of the said section.

* * * * *

US006334132C1

(12) EX PARTE REEXAMINATION CERTIFICATE (10615th)
United States Patent
Weeks

(10) Number: US 6,334,132 C1
(45) Certificate Issued: Jun. 5, 2015

(54) METHOD AND APPARATUS FOR CREATING A CUSTOMIZED SUMMARY OF TEXT BY SELECTION OF SUB-SECTIONS THEREOF RANKED BY COMPARISON TO TARGET DATA ITEMS

(75) Inventor: Richard Weeks, Felixstowe (GB)

(73) Assignee: SUFFOLK TECHNOLOGIES, LLC, Bridgewater, NJ (US)

Reexamination Request:
No. 90/012,427, Aug. 10, 2012

Reexamination Certificate for:
Patent No.: 6,334,132
Issued: Dec. 25, 2001
Appl. No.: 09/077,603
PCT Filed: Apr. 16, 1998
PCT No.: PCT/GB98/01119
§ 371 (c)(1),
(2), (4) Date: Jun. 2, 1998
PCT Pub. No.: WO98/47083
PCT Pub. Date: Oct. 22, 1998

(30) Foreign Application Priority Data

Apr. 16, 1997 (EP) .................................... 97302616

(51) Int. Cl.
*G06F 17/30* (2006.01)
(52) U.S. Cl.
CPC ... *G06F 17/30719* (2013.01); *Y10S 707/99942* (2013.01)
(58) Field of Classification Search
None
See application file for complete search history.

(56) References Cited

To view the complete listing of prior art documents cited during the proceeding for Reexamination Control Number 90/012,427, please refer to the USPTO's public Patent Application Information Retrieval (PAIR) system under the Display References tab.

*Primary Examiner* — Simon Ke

(57) ABSTRACT

A system for summarizing data sets stores target data items and divides the data set into sections. Each section is compared against the target data items and a ranking value is calculated for each section dependent on the outcome of the comparisons. A summary of the data set is then compiled from sections having a ranking value past a pre-determined threshold value.

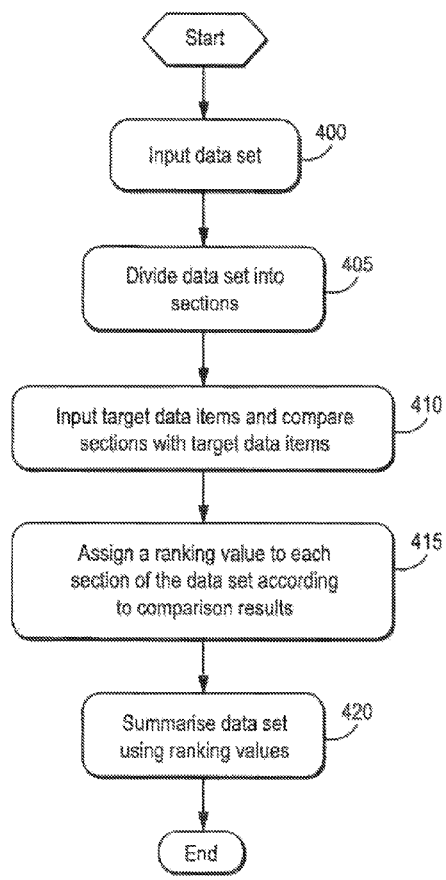

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1, 2, 8 and 9 are cancelled.

Claims 3-7 and 10-13 were not reexamined.

\* \* \* \* \*